United States Patent
Mitsuoka et al.

(10) Patent No.: US 6,842,558 B2
(45) Date of Patent: Jan. 11, 2005

(54) OPTICAL SWITCH MANUFACTURING METHOD THEREOF

(75) Inventors: Yasuyuki Mitsuoka, Chiba (JP); Hidetaka Maeda, Chiba (JP); Norio Chiba, Chiba (JP); Takashi Niwa, Chiba (JP); Yoko Shinohara, Chiba (JP); Kenji Kato, Chiba (JP); Susumu Ichihara, Chiba (JP); Norihiro Dejima, Chiba (JP)

(73) Assignee: Seiko Instruments Inc., Chiba (JP)

( * ) Notice: Subject to any disclaimer, the term of this patent is extended or adjusted under 35 U.S.C. 154(b) by 72 days.

(21) Appl. No.: 10/294,833

(22) Filed: Nov. 14, 2002

(65) Prior Publication Data

US 2003/0133648 A1 Jul. 17, 2003

(30) Foreign Application Priority Data

| | | |
|---|---|---|
| Nov. 15, 2001 | (JP) | 2001-350651 |
| Mar. 13, 2002 | (JP) | 2002-068437 |
| Apr. 25, 2002 | (JP) | 2002-124250 |
| Apr. 25, 2002 | (JP) | 2002-124260 |
| May 17, 2002 | (JP) | 2002-143364 |
| May 17, 2002 | (JP) | 2002-143366 |
| May 17, 2002 | (JP) | 2002-143371 |
| Nov. 8, 2002 | (JP) | 2002-324932 |

(51) Int. Cl.[7] ............................................. G02B 6/35
(52) U.S. Cl. ................. 385/23; 385/16; 385/17; 385/20; 385/22; 385/25
(58) Field of Search ........................ 385/23, 20, 22, 385/16, 17, 25

(56) References Cited

U.S. PATENT DOCUMENTS

| | | | | |
|---|---|---|---|---|
| 4,896,935 A | * | 1/1990 | Lee | 385/22 |
| 6,421,477 B1 | * | 7/2002 | Hane et al. | 385/21 |
| 6,571,035 B1 | * | 5/2003 | Pi et al. | 385/30 |
| 2002/0025108 A1 | * | 2/2002 | Lu | 385/23 |
| 2004/0022484 A1 | * | 2/2004 | Sigloch et al. | 385/22 |
| 2004/0114856 A1 | * | 6/2004 | Kubby et al. | 385/16 |

* cited by examiner

*Primary Examiner*—Jared J. Fureman
*Assistant Examiner*—Allyson N Trail
(74) *Attorney, Agent, or Firm*—Adams & Wilks

(57) ABSTRACT

There is disclosed an optical switch consisting of a support substrate, a movable raw optical fiber, a fixed raw optical fiber, a magnetic member for the movable raw optical fiber, and a leaf spring. The fibers are disposed in a V-shaped groove formed in the substrate. The magnetic member is actuated by an electromagnet disposed above the substrate. The leaf spring pushes the movable raw optical fiber into the V-shaped groove. The structure of the switch is relatively simple. Since the movable raw optical fiber is pushed using the leaf spring, the switch is less affected by the assembly accuracy than conventional. It is easy to make adjustments during assembly. Consequently, high-performance, low-cost, optical switch that can be mass-produced can be offered.

22 Claims, 32 Drawing Sheets

FIG. 5
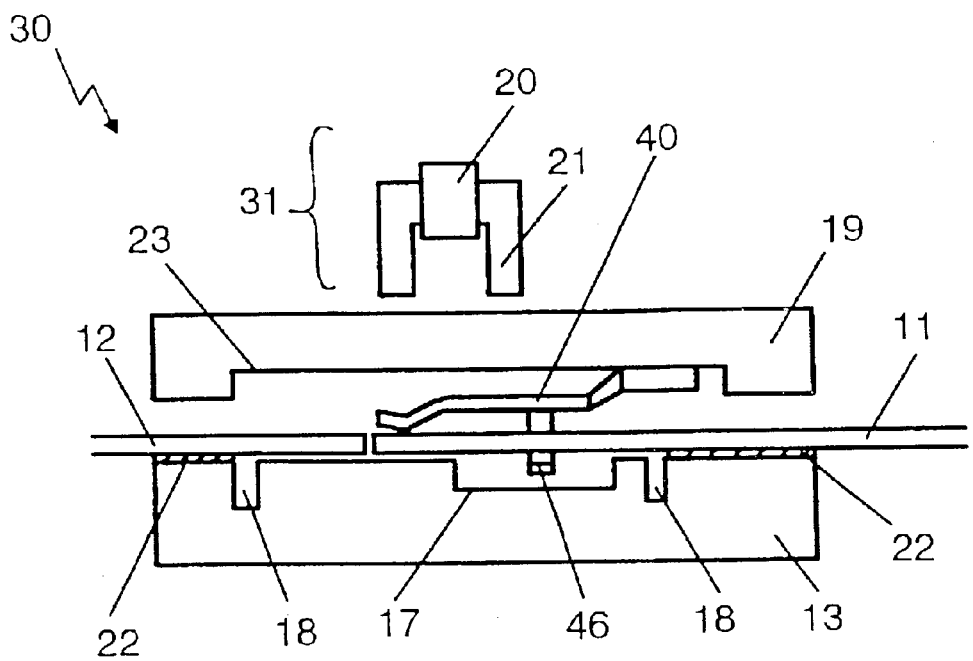
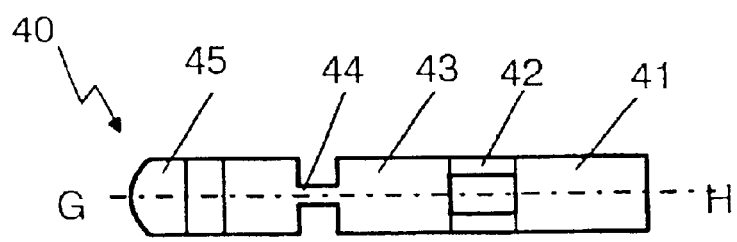
FIG. 6A
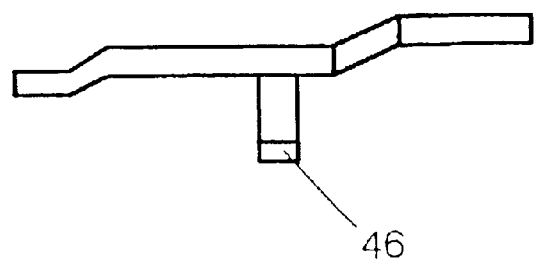
FIG. 6B

827

S101

S102

S103

S401

S402

OPTICAL SWITCH MANUFACTURING METHOD THEREOF

BACKGROUND OF THE INVENTION

1. Field of the Invention

This invention relates to an optical switch that is used in optical communications to switch or cut off an optical path such as a fiber optic transmission path.

2. Description of the Related Art

Conventionally, mechanical optical switches designed to directly drive optical fibers or prisms to switch optical paths have been often used as optical switches for switching or cutting off fiber optic transmission paths as used in the field of optical communications. The mechanical optical switches designed to directly drive optical fibers to switch or cut off optical paths are relatively simple in structure and have features including low insertion loss, small size, and low power consumption. Therefore, many structures have been proposed. FIG. 4 shows such a structure.

This structure is a 1×2 optical switch, and is made up of a single movable raw optical fiber 1 having a base portion cantilevered to a first cylindrical tube 7, a magnetic body 5 having desired magnetic characteristics and firmly fixed to the surface of the movable raw optical fiber 1 near its front end, a hollow solenoid coil 6 for inverting the magnetic poles at the opposite ends of the magnetic body 5 by varying the sense of current flowing through the magnetic body, a pair of permanent magnets 8a, 8b for applying a magnetic attractive force to the magnetic body 5 perpendicularly to the optical axis, cylindrical halves 3a and 3b having flat portions provided with V-shaped grooves 4, two fixed raw optical fibers 2a and 2b fixed over the V-shaped grooves 4, and an elongated cylindrical sleeve 9 for holding the first cylindrical tube 7 and cylindrical halves 3a, 3b in alignment. The sleeve 9 also holds the hollow solenoid coil 6 and the permanent magnets 8a, 8b.

The operation of the present structure is as follows. The movable raw fiber 1 is magnetically attracted to either one of the permanent magnets 8a and 8b according to the magnetic poles of the opposite ends of the magnetic body 5. The front end of the movable raw optical fiber 1 is optically coupled to either one of the two fixed raw optical fibers 2a and 2b over the V-shaped grooves 4 formed in the flat portions of the cylindrical halves 3a and 3b. The hollow solenoid coil 6 is electrically energized to apply a magnetic field to the magnetic body 5 along the optical axis. In this way, the magnetic poles of the opposite sides of the magnetic body 5 are inverted. The movable optical fiber 1 is attracted to the other permanent magnet and optically coupled to the other fixed raw optical fiber. When the solenoid coil is not electrically energized, the magnetic body 5 is also magnetically attracted to any permanent magnet. Therefore, coupling into one of the two fixed raw optical fibers 2a, 2b can be maintained. Consequently, a self-holding switching operation can be obtained.

The above-described operation pertains to 1×2 optical switching operation. If one takes notice of one optical path, this structure can also be used as an optical shutter, because it can uninterrupt and interrupt the optical path.

Besides, an optical switch designed to directly drive an optical fiber to switch an optical path has been proposed.

In the related art structure shown in FIG. 4, main components such as cylindrical halves 3a, 3b and elongated cylindrical sleeve 9 require quite high machining accuracy and assembly accuracy. For this reason, the costs of the components are high. In addition, it takes a long time to assemble the structure. In this way, high costs have been incurred.

Existing mechanical optical switches, not limited to the above-described structure, are relatively simple in construction but components machined at high accuracy are required. Even if the components are machined at higher accuracy, it takes a long time to make adjustments during assembly in order to obtain high-performance optical characteristics, because there are machining tolerances and assembly errors. Hence, they have the problem that they are not adapted for mass production and cost reductions.

In view of the foregoing, the present invention has been made. It is an object of the invention to provide a high-performance, low-cost, optical switch which is relatively simple in structure, includes main components capable of being fabricated economically and accurately, can be easily adjusted during assembly, and is adapted for mass production.

SUMMARY OF THE INVENTION

To achieve the above-described object, the present invention provides an optical switch comprising: a single movable raw optical fiber capable of cantilevering; at least one groove; at least one fixed raw optical fiber having an end surface that is spaced a given distance from an end surface of the movable raw optical fiber, vicinities of the front end of the fixed raw optical fiber being aligned along the groove; a push body for pushing vicinities of the front end of the movable raw optical fiber toward the groove; a lift structure for moving the front end of the movable raw optical fiber away from the groove; and a control device for controlling the operation of at least one of the push body and the lift structure. The movable optical fiber is brought into and out of alignment along the groove to thereby switch or otherwise uninterrupt and interrupt an optical path.

Accordingly, with this relatively simple configuration, the push body pushes the movable raw optical fiber toward the groove to thereby align the movable and fixed raw optical fibers along the groove. Thus, the fibers are optically coupled. Consequently, a high-performance optical switch that is easy to adjust during assembly can be obtained.

In one feature of the invention, the aforementioned at least one groove in the optical switch described above consists of two substantially parallel grooves having opening portions opposite to each other. As the movable raw optical fiber is moved, it is aligned along at least one of the two grooves.

Accordingly, it is possible to cope with 1×2 optical switching action and with an operation for reversing the present state of the optical path (i.e., uninterrupting or interrupting the path).

Furthermore, in the optical switch according to the invention, the movable and fixed raw optical fibers have end surfaces formed at an angle to a plane perpendicular to the direction of the center axis of each fiber.

In consequence, the return loss can be reduced. As a result, high-performance optical characteristics can be obtained.

In addition, the optical switch according to the invention is characterized in that at least a part of the above-described push body has a resilient structure that is displaced substantially perpendicularly to the groove or grooves.

Therefore, the load applied by the push body in the direction of the groove can be adjusted by the resilient structure of the push body. Hence, a high-performance optical switch that is easy to adjust during assembly can be obtained.

In a further feature of the optical switch according to the invention, the lift structure described above makes use of the resilient force of the movable raw optical fiber.

Accordingly, the lift structure is made simpler. The number of components is reduced. The assembly time can be shortened.

In a yet other feature of the optical switch according to the invention, the lift structure makes use of the magnetic force acting between the control device and this lift structure.

Accordingly, the driving force of the movable raw optical fiber can be easily controlled by the control device and so a high-performance optical switch that is easy to adjust during assembly can be derived.

In a still other feature of the optical switch according to the invention, the push body and the lift structure are fabricated integrally.

Accordingly, the number of components is reduced. It is easy to assemble and adjust the push body and lift structure.

In a yet other feature of the optical switch according to the invention, the control device is an electromagnet.

Accordingly, a high-performance optical switch can be obtained in which the control device can be controlled very easily and adjusted easily during assembly.

BRIEF DESCRIPTION OF THE DRAWINGS

FIG. 5 is a cross-sectional view showing the structure of an optical switch according to Embodiment 3 of the invention;

FIGS. 6A and 6B are schematic views showing the structure of a composite leaf spring used in the optical switch according to Embodiment 3 of the invention;

DETAILED DESCRIPTION OF THE PREFERRED EMBODIMENTS

The present invention is hereinafter described in detail with reference to the accompanying drawings. It is to be noted that the invention is not limited by the preferred embodiments to be described below.

Embodiment 1

Figure 1A:
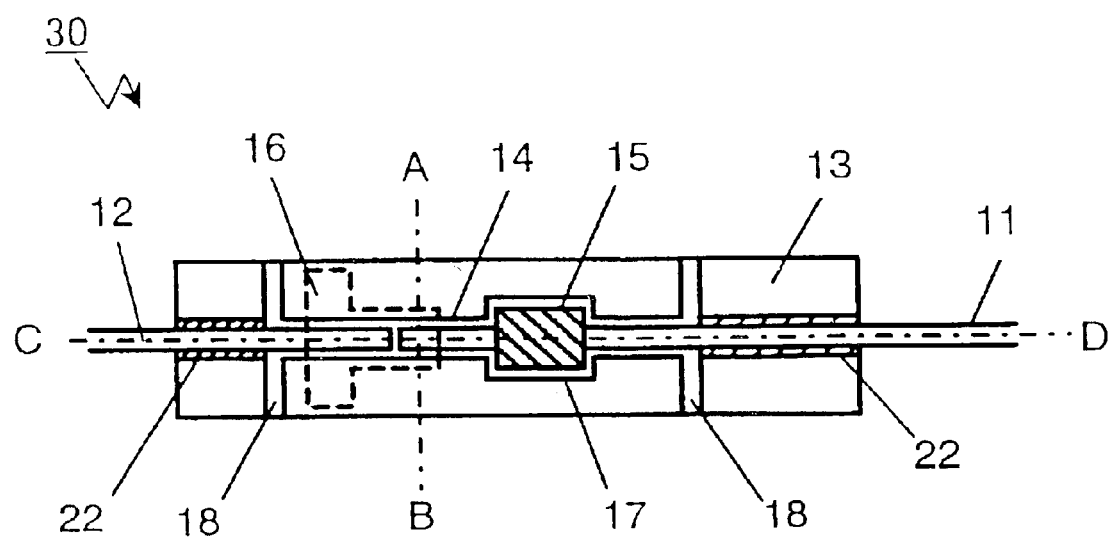
FIGS. 1A and 1B are schematic views showing main portions of an optical switch according to Embodiment 1 of the present invention.
Figure 1B:
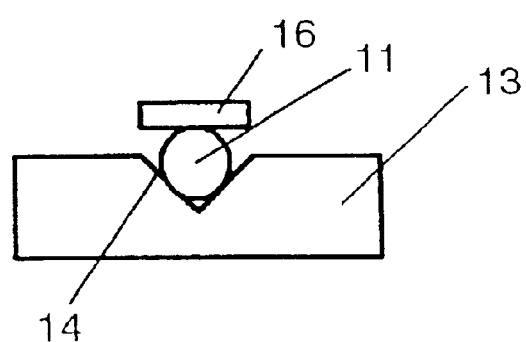

FIGS. 1A and 1B show the structures of main portions of an optical switch according to Embodiment 1 of the present invention. FIG. 1A is a top view of the switch. FIG. 1B is a cross-sectional view taken on line A–B of FIG. 1A. For simplicity, invisible components are not shown. The optical switch, generally indicated by reference numeral 30, consists of a support substrate or base 13 provided with a V-shaped groove 14 in its top surface. A movable raw optical fiber 11 and a fixed raw optical fiber 12 are held in the V-shaped groove 14 in such a way that their end surfaces are close to each other. The movable raw optical fiber 11 has a portion 22 bonded to the support substrate 13 with resin or the like such that the movable raw optical fiber can cantilever. A cylindrical magnetic body 15 having desired magnetic characteristics is mounted at a given distance from the front end of this fiber. The fixed raw optical fiber 12 has a portion 22 held to the support substrate 13.

The magnetic body 15 acts as a driver for driving the movable raw optical fiber 11 substantially perpendicularly to the support substrate 13. The movable raw optical fiber 11 is pressed into the V-shaped groove 14 by a given force of a leaf spring 16 in a location closer to the front end of the fiber 11 than the magnetic body 15, the spring 16 having desired spring constant and magnetic characteristics. The support substrate 13 is provided with the V-shaped groove 14 through which the movable raw optical fiber 11 and fixed raw optical fiber 12 are laid. The substrate 13 is also provided with a counterbore 17 and escape grooves 18. The counterbore 17 has sufficient width and depth to prevent the magnetic body 15 from abutting against the support substrate 13. The escape grooves 18 prevent adhesive such as resin from the bonded portion 22 from going its way to other than the bonded portion 22 along non-straight routes.

With respect to each of the movable raw optical fiber 11 and fixed raw optical fiber 12, the plastic layer protecting the fiber core is removed over a given length from the front end to expose the raw fiber portion. This raw fiber portion is aligned along the V-shaped groove 14. The end surfaces of the two fibers are formed at an angle to a plane vertical to the center axis of the core. The end surfaces of the fibers are placed parallel, opposite, and close to each other.

Figure 2A:
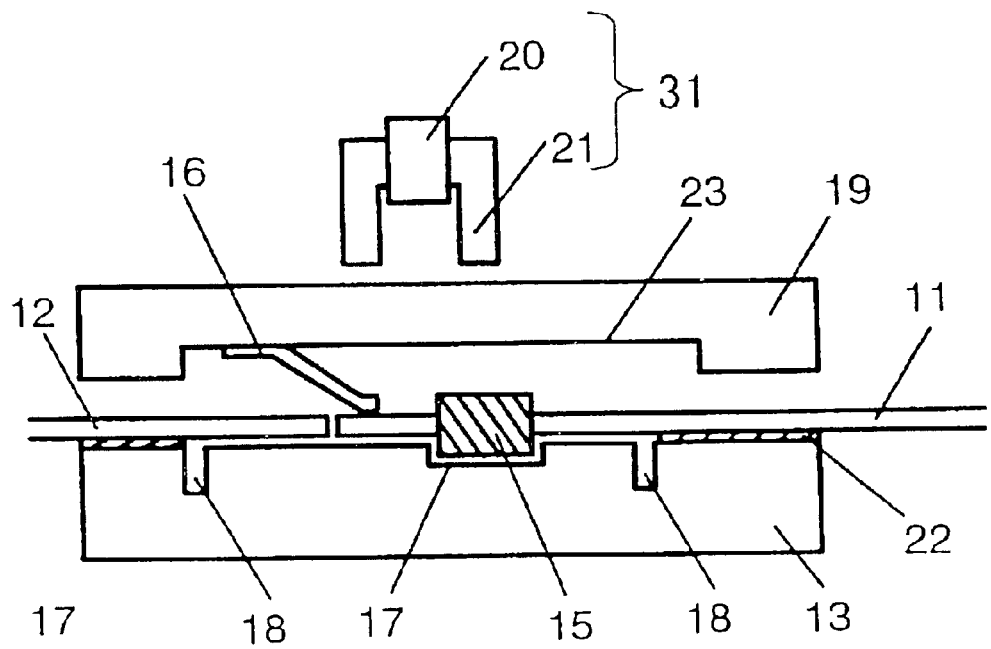
FIGS. 2A and 2B are cross-sectional views illustrating the structure and operation of the optical switch according to Embodiment 1 of the invention.
Figure 2B:
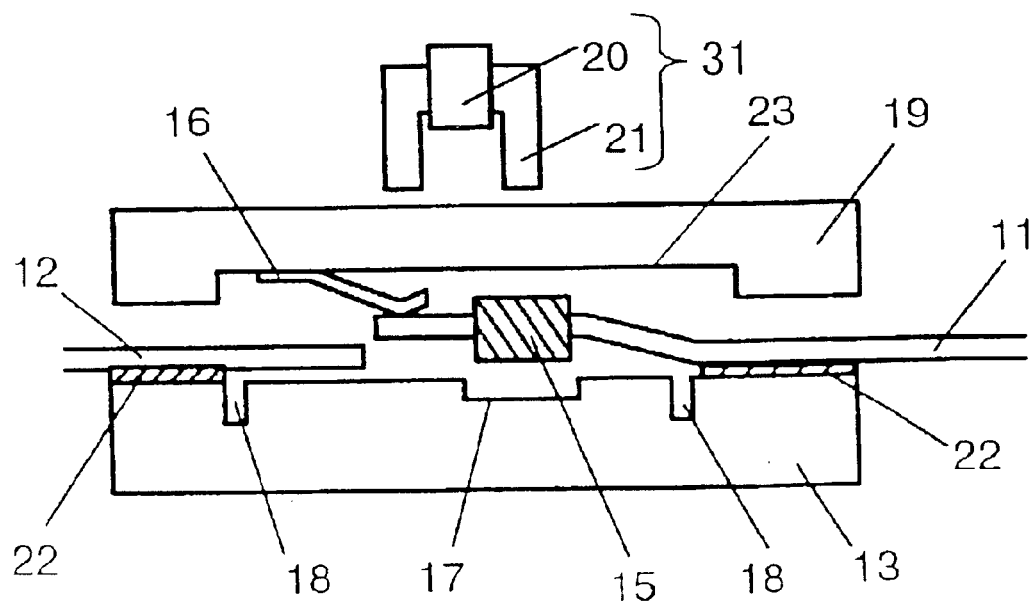

FIGS. 2A and 2B are cross sections taken on line C–D of FIG. 1A. FIG. 2A shows the state in which an optical path is established. FIG. 2B shows the state in which the path is cut off. An upper substrate or base 19 is formed over the support substrate 13. An electromagnet 31 having a coil 20 and a core 21 is mounted over the upper substrate. The upper substrate 19 is provided with a recess 23 having a desired depth to prevent the operation of the movable optical fiber 11 from being hindered. The leaf spring 16 is firmly held in this recess 23. The leaf spring 16 pushes vicinities of the front end of the movable raw optical fiber 11 toward the support substrate 13.

FIG. 2A shows the state in which the coil 20 is not electrically energized. Because the leaf spring 16 pushes the vicinities of the front end of the movable raw optical fiber 11 into the V-shaped groove 14, the end surfaces of the movable raw optical fiber 11 and fixed raw optical fiber 12 are placed opposite and close to each other along the V-shaped groove 14. The movable raw optical fiber 11 and fixed raw optical fiber 12 are optically coupled, thus forming an optical path.

On the other hand, FIG. 2B shows the state in which the coil 20 is energized with a given electrical current. Magnetic attraction is exerted between the ends of the core 21 and each of the magnetic body 15 and leaf spring 16. This magnetic attraction is sufficiently greater than the resilient force acting between the movable raw optical fiber 11 and the leaf spring 16. At this time, the resilient structure of the leaf spring 16 deforms, and its front end is pulled upward. As a result, the movable raw optical fiber 11 is no longer pushed into the V-shaped groove. The upper substrate 19 is provided with the recess 23. The magnetic body 15 is pulled upward by the magnetic attraction. This bends the cantilevered movable raw optical fiber 11 toward the electromagnet 31, separating the front end of the movable raw optical fiber 11 from the V-shaped groove 14, thus cutting off the optical path.

When the coil 20 is again deenergized, the magnetic attraction between the ends of the core 21 and each of the leaf spring 16 and magnetic body 15 disappears. The resilient force between the movable raw optical fiber 11 and the leaf spring 16 aligns the movable raw optical fiber 11 along the V-shaped groove 14. The fiber is again pressed into the V-shaped groove 14 by the leaf spring 16. The movable raw optical fiber 11 and fixed raw optical fiber 12 are placed such that their end surfaces are close and opposite to each other. Hence, the fibers are again optically coupled. In this way, an optical switch is constructed in which the optical path can be easily established and cut off by energizing and deenergizing the coil 20.

The magnetic attraction acting on the leaf spring 16 and magnetic body 15 can be easily controlled by the current supplied into the coil 20. Therefore, the magnitude of the force urging the movable raw optical fiber 11 into the V-shaped groove 14 and the magnitude of the force pulling the fiber out of the V-shaped groove 14 can be easily controlled. Consequently, the optical effects of the optical switch produced by external vibrations can be reduced or otherwise controlled easily.

In the present embodiment, the electromagnet 31 has the core 21 and coil 20. Obviously, it suffices to control the magnetic force acting on the leaf spring 16 and magnetic body 15 substantially perpendicularly to the support substrate 13 by means of an external current. For example, the electromagnet may be a coreless solenoid coil or an electromagnet consisting of a permanent magnet around which a coil is wound. In the electromagnet 31, the core 21 is shaped like the letter "U" to reduce the space between the opposite ends of the core 21, for magnetically attracting the magnetic body 15 and leaf spring 16 mainly disposed close to the opposite ends of the core 21. Magnetically speaking, therefore, the electromagnet is close to a closed circuit and the amount of magnetic field leaking to the surroundings is small.

The magnetic body 15 and leaf spring 16 are made of a soft magnetic material such as nickel or Permalloy. Since the magnetic body 15 is only required to transmit the magnetic force from the electromagnet 31 to the movable raw optical fiber 11, it suffices that at least a part of the magnetic body 15 be fabricated from a magnetic material. For instance, a minute plate made of a soft magnetic material may be adhesively bonded to a cylindrical holding body through which the movable raw optical fiber 11 is passed. Alternatively, a soft magnetic material may be formed as a film on the side surface of the movable raw optical fiber 11 by evaporation or plating.

The leaf spring 16 may consist of a nonmagnetic stainless steel to which a soft magnetic material such as Permalloy is stuck. The soft magnetic material may be deposited by evaporation or plating. The leaf spring 16 may also be replaced by a structure that is different from a leaf spring and has a resilient structure in its part. The resilient force of this resilient structure pushes the movable raw optical fiber 11 toward the support substrate 13.

Alternatively, each of the magnetic body 15 and leaf spring 16 may consist of a member of a nonmagnetic stainless steel to which a permanent magnet is stuck. The electromagnet 31 may be disposed below the support substrate 13, and magnetic repulsion may be used instead of magnetic attraction. Furthermore, instead of sticking a permanent magnet, it may be formed by a plating process.

In addition, a contact portion may be formed close to the front end of the leaf spring 16 coming into contact with the movable raw optical fiber 11 by giving a curvature to the leaf spring 16 or bonding a shock-absorbing member. The curvature may be given by plastically deforming the leaf spring 16. Damage to the optical fiber made of quartz can be prevented by pushing the movable raw optical fiber 11 via the contact portion. Furthermore, it is obvious that the leaf spring 16 may be fixed to the support substrate 13 instead of to the upper substrate 19.

The support substrate 13 can consist of a silicon wafer. The V-shaped groove 14 and counterbore 17 can be formed accurately by anisotropic etching of crystal. The upper substrate 19 having the recess 23 consists of a silicon wafer or glass substrate, and can be easily fabricated by anisotropically etching a silicon crystal wafer or etching the glass substrate with HF.

With respect to the optical switch described above, the surroundings of the opposite end surfaces of the movable raw optical fiber 11 and fixed raw optical fiber 12 may be filled with a refractive index matching liquid in use, or they may be used in air. Where they are used in air, the reflective end surfaces are preferably coated to reduce reflection in order to reduce insertion loss due to reflection at the surfaces of the end surfaces of the optical fibers and to reduce the return loss and crosstalk. The distance between the end surfaces is preferably reduced to approximately 10 microns to reduce insertion loss. It is desired to form the end surfaces at an angle of 5° to 8° to a plane perpendicular to the center axis of the core to reduce return loss.

Where the end surfaces of the optical fibers are formed at an angle to a plane perpendicular to the center axis of the core and the surroundings of the end surfaces are not filled with any refractive index matching liquid, optical axes will deviate due to refraction at the end surfaces of the optical fibers, thus giving rise to insertion loss. To reduce this loss, two V-shaped grooves corresponding to optical axis deviations for the movable raw optical fiber 11 and fixed raw optical fiber 12, respectively, may be formed and the fibers 11 and 12 may be aligned along their respective V-shaped grooves rather than the fibers 11 and 12 are aligned along the single V-shaped groove 14 formed in the support substrate 13. The V-shaped grooves for the two fibers, respectively, can be formed in the silicon wafer accurately easily using anisotropic etching of crystal.

In the optical switch according to the present invention, the electromagnet substantially forms a magnetic closed circuit. Therefore, the effects of magnetic field leaking to the surroundings are small. Hence, plural optical switches can be arranged in proximity. In addition, where the optical switches are magnetically shielded, for example, by covering the switches with Permalloy, the effects of the electromagnets of adjacent optical switches can be prevented, if the optical switches according to the invention are placed in proximity to each other.

As described thus far, the optical path can be easily established and cut off by turning on and off the current flowing through the coil to thereby displace the movable raw optical fiber 11 from the V-shaped groove 14. Since the movable raw optical fiber 11 is pressed into the V-shaped groove 14 by the leaf spring 16, a transient state in which the front end of the movable raw optical fiber 11 vibrates within the V-shaped groove 14 when the current is turned off can be suppressed. As a result, a short switching time can be accomplished. Furthermore, if vibrations are applied to the optical switch in a deenergized state, the optical path is prevented from being cut off. In consequence, stable characteristics can be obtained.

Furthermore, the support substrate 13 and upper substrate 19 are made of glass or silicon. Therefore, there is only a small difference between their thermal coefficient of expansion and the thermal coefficient of expansion of the optical fibers made of quartz. Consequently, stable switching operation can be performed if temperature variations occur. Moreover, the support substrate 13 and upper substrate 19 are machined accurately, and they are bonded together with adhesive or gold solder. Therefore, it is easy to seal the main portions of the optical switch. As a consequence, the reliability against temperature and moisture variations is enhanced.

In addition, the support substrate 13 and upper substrate 19 that are main components can be fabricated from silicon wafer in large quantities at low costs and accurately. Moreover, they are relatively simple in structure. Since the movable optical fiber 11 is pressed into the V-shaped groove 14 by the leaf spring 16, the effects of assembly error are small. It is easier to make adjustments during assembly. For these reasons, optical switches having high performance can be offered in large quantities economically.

Embodiment 2

Figure 3:
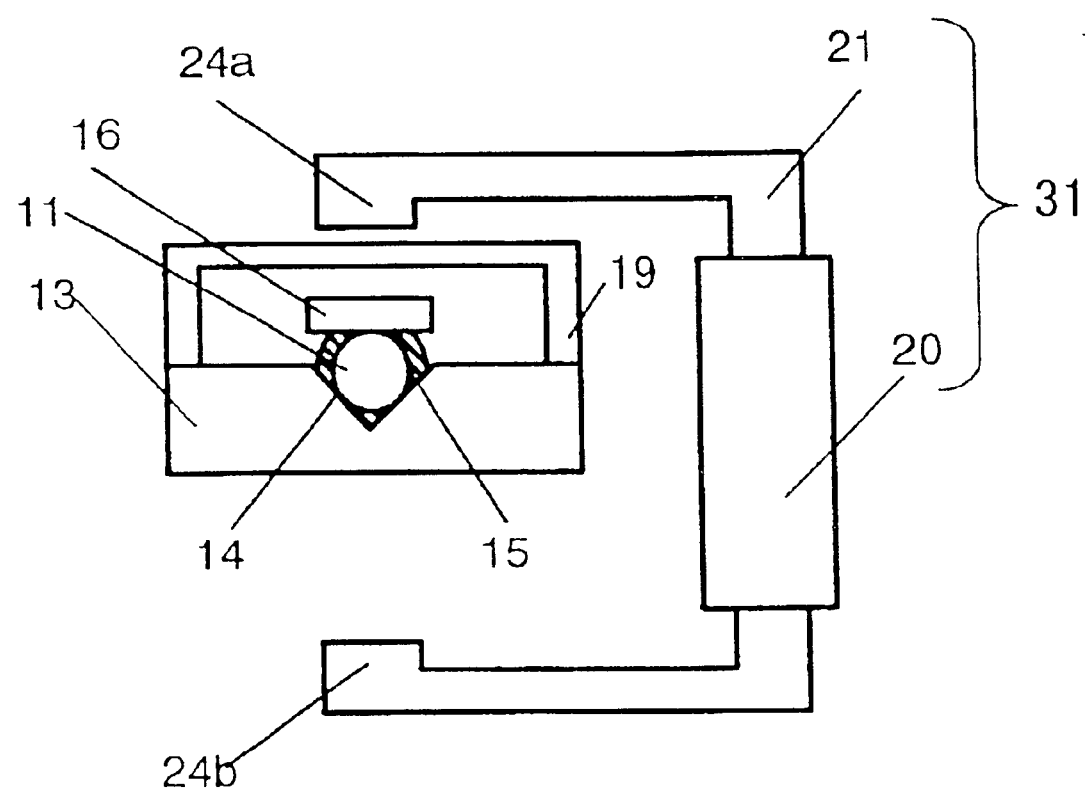
FIG. 3 is a cross-sectional view showing the structure of an optical switch according to Embodiment 2 of the invention.
Figure 4:
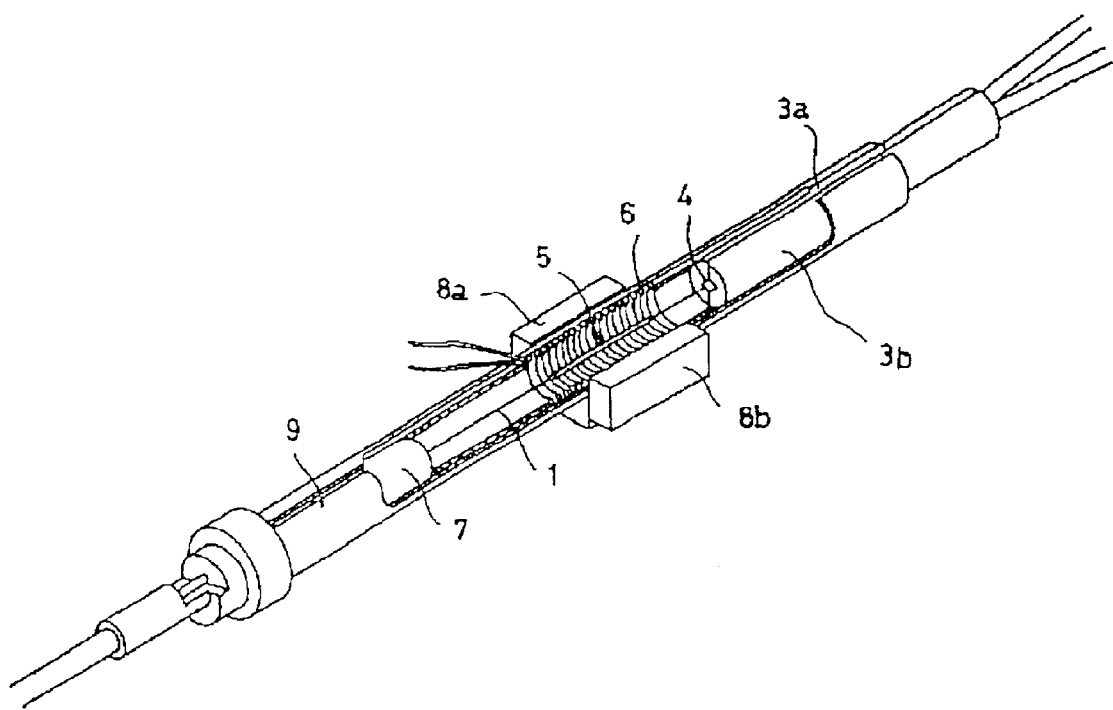
FIG. 4 is a perspective view showing an optical switch structure of related art.

FIG. 3 is a cross-sectional view showing the structure of an optical switch according to Embodiment 2 of the present invention. In Embodiment 1, the electromagnet is placed over the upper substrate. In Embodiment 2, the arrangement of the electromagnet is modified. Other structures are similar to those of Embodiment 1 and thus their description will be omitted.

In FIG. 3, one end 24a of the core 21 is located over the upper substrate 19, while the other end 24b is located below the support substrate 13. The distances from one end 24a of the core 21 to the magnetic body 15 and to the leaf spring 16 are set sufficiently smaller than the distances from the other end 24b to the magnetic body 15 and to the leaf spring 16. Because of this arrangement, the magnetic attraction acting on the magnetic body 15 and leaf spring 16 is greater at one end 24a than at the other end 24b. Therefore, the magnetic body 15 and leaf spring 16 are pulled toward the upper substrate 19. When the magnetic attraction from the electromagnet 31 ceases, the movable raw optical fiber 11 returns into the V-shaped groove 14. To stabilize the switching action quickly, the movable raw optical fiber 11 and core 21 are preferably so arranged that the direction of motion of the movable raw optical fiber 11 is substantially coincident with the direction connecting the opposite ends of the core 21.

Since the electromagnet 31 is arranged in this way, the magnetic attraction from the electromagnet 31 acts on the leaf spring 16 and magnetic body 15 more effectively than in Embodiment 1. If the current flowing through the electromagnet 31 is small, large magnetic attraction can be obtained. That is, power consumption of the electromagnet 31 can be reduced.

Embodiment 3

FIG. 5 is a cross-sectional view showing the structures of main portions of an optical switch according to Embodiment 3 of the present invention. This cross-sectional view corresponds to the cross section taken on line C–D of FIG. 1A. In Embodiment 1, the movable raw optical fiber is pulled out of the V-shaped groove using the magnetic body 15. In Embodiment 3, a composite leaf spring 40 is used and thus the magnetic body 15 is dispensed with. Other structures are similar to those of Embodiment 1 and thus their description is omitted below.

The composite leaf spring 40 having desired spring constant and magnetic characteristics is firmly mounted in the recess 23 formed in the upper substrate 19 instead of the leaf spring 16 shown in FIGS. 1 and 2. This spring urges the vicinities of the front end of the movable raw optical fiber 11 into the V-shaped groove 14. The composite leaf spring 40 has an annular lift portion 46 in its lower part. The inside diameter of the lift portion 46 is greater than the outside diameter of the movable raw optical fiber 11. The movable raw optical fiber 11 is inserted in the lift portion 46.

FIGS. 6A and 6B show the construction of the composite leaf spring 40. FIG. 6A is a top view of this spring. FIG. 6B is a cross-sectional view taken on line G–H of FIG. 6A. The composite leaf spring 40 is made up of a portion 41 adhesively bonded to the upper substrate 19, a lift spring portion 42 having a desired spring constant, a connector portion 43 supporting the lift portion 46, a pushing spring portion 44 having a desired spring constant, and a pushing portion 45 for pushing the vicinities of the front end of the movable raw optical fiber 11 into the V-shaped groove 14. These portions are fabricated integrally.

The operation is described. FIG. 5 shows the state in which the coil 20 is not electrically energized. The movable raw optical fiber 11 is aligned along the V-shaped groove 14 and pressed toward the support substrate 13 by the pushing portion 45 of the composite leaf spring 40. As a result, the end surfaces of the fixed raw optical fiber 12 and movable raw optical fiber 11 are close and opposite to each other, thus forming an optical path.

When the coil 20 is electrically energized, magnetic attraction is exerted between the end of the core 21 and the composite leaf spring 40. This magnetic attraction is sufficiently greater than the resilient force of the lift spring portion 42 of the composite leaf spring 40 or the movable raw optical fiber 11. At this time, the lift spring portion 42 resiliently deforms, pulling the connector portion 43 upward. This in turn pulls up the pushing portion 45 continuous with the connector portion 43. The movable raw optical fiber 11 is no longer pushed into the V-shaped groove 14. The lift portion 46 held by the connector portion 43 is also lifted and so the cantilevered movable raw optical fiber 11 inserted in the lift portion 46 is bent toward the electromagnet 31. The front end of the movable raw optical fiber 11 moves away from the V-shaped groove 14, thus cutting off the optical path.

When the coil 20 is again electrically deenergized, the magnetic attraction between the end of the core 21 and the composite leaf spring 40 ceases and, therefore, the movable raw optical fiber 11 is aligned along the V-shaped groove 14. The movable raw optical fiber 11 and fixed raw optical fiber 12 are again optically coupled.

The composite leaf spring 40 is made of a soft magnetic material such as nickel or Permalloy in the same way as the leaf spring 16. Alternatively, a member of a soft magnetic material such as Permalloy may be stuck to a member of nonmagnetic stainless steel, because it is only necessary that at least a part of the composite leaf spring 40 be made of a magnetic material. Also, a member of a soft magnetic material may be formed on a member of stainless steel by evaporation or plating. In addition, the composite leaf spring 40 may consist of nonmagnetic stainless steel to which a permanent magnet is stuck. The electromagnet 31 may be disposed below the support substrate 13, and the composite leaf spring 40 may be driven using magnetic repulsion instead of magnetic attraction.

Damage to the movable raw optical fiber 11 made of quartz can be prevented by giving a curvature to the pushing portion 45 and lift portion 46 via which the composite leaf spring 40 and movable raw optical fiber 11 come into contact with each other or sticking shock-absorbing members, in the same way as the leaf spring 16.

In the present embodiment, the lift spring portion 42 consists of two straight beams that connect the bonded portion 41 and connector portion 43. Any desired spring constant or displacement mode can be set by varying the shapes, lengths, and widths of the beams. For example, the current driving the electromagnet 31 can be reduced with decreasing the spring constant of the lift spring portion 42. Therefore, each beam can be bent like the letter "U" instead of into a linear form. This increases the substantial length of the beam, thus reducing the spring constant.

The pushing spring portion 44 has a constricted portion narrower than the connector portion 43 and pushing portion 45 in the present embodiment. The load applied to the movable raw optical fiber 11 can be adjusted by varying the width or length of the constricted portion. Since the pushing spring portion 44 has a constricted shape, the pushing portion 45 can be rotated about the axis G-H. Where the composite leaf spring 40 is mounted to be rotatable about the axis G-H, the pushing portion 45 is not disposed parallel to the surface of the support substrate 13. The pushing portion 45 abuts on the support substrate 13 on only one side and can no longer push the movable raw optical fiber 11 into the V-shaped groove 14. However, because of the constricted flexure structure, the pushing portion 45 can align itself parallel to the surface of the substrate 13. Hence, it can push the movable raw optical fiber 11 into the V-shaped groove 14.

In this way, the structure for lifting the movable raw optical fiber 11 from the V-shaped groove 14 using the composite leaf spring 40 can be integrated with the structure for pushing the fiber into the V-shaped groove 14. This can reduce the number of components. The time required for assembly and adjustments can be reduced.

Embodiment 4

Figure 7:
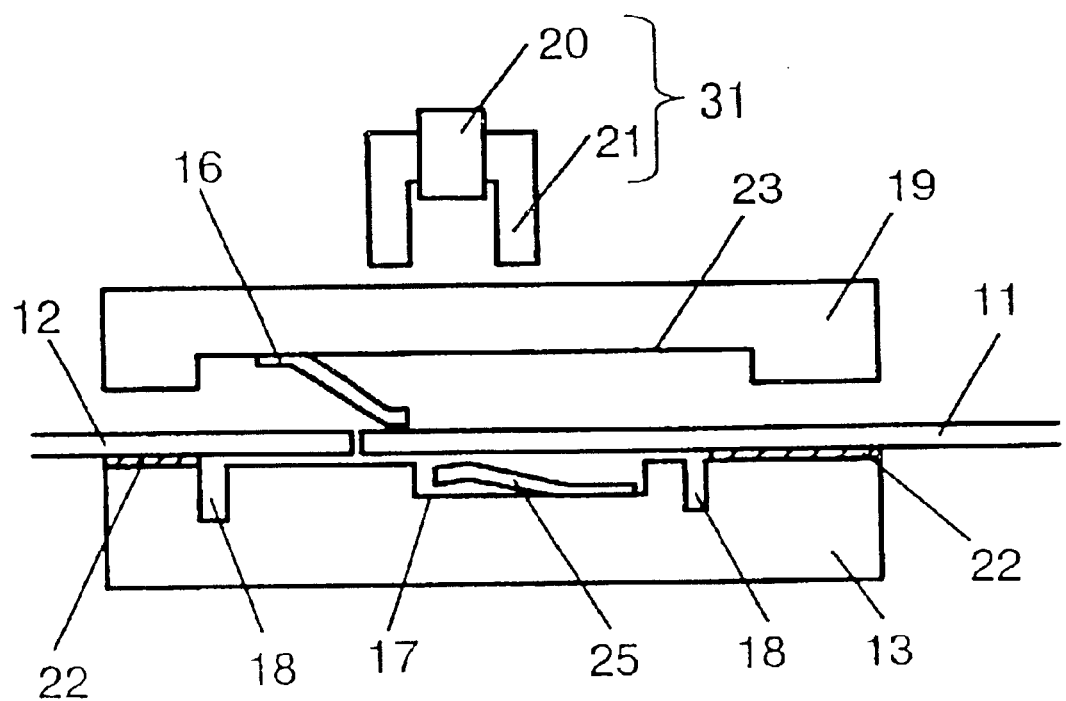
FIG. 7 is a cross-sectional view showing the structure of an optical switch according to Embodiment 4 of the invention.

FIG. 7 is a cross-sectional view showing the structure of an optical switch according to Embodiment 4 of the present invention. In Embodiment 1, the magnetic body 15 is formed on the movable raw optical fiber 11. In Embodiment 4, a push-up leaf spring 25 is used instead of the magnetic body 15. Other structures are similar to those of Embodiment 1 and so their description will be omitted below.

The push-up leaf spring 25 having desired spring constant and magnetic characteristics is disposed inside the counterbore 17 formed in the support substrate 13. When the coil 20 is not electrically energized and magnetic attraction from the electromagnet 31 does not act, the push-up leaf spring 25 is not in contact with the movable raw optical fiber 11. When the coil 20 is energized and the electromagnet 31 exerts magnetic attraction, the push-up leaf spring 25 is pulled up, so that the movable raw optical fiber 11 is pushed up by the leaf spring 25 toward the electromagnet 31. When the coil 20 is not energized, the original state is regained by the resilient force of the leaf spring 25. The movable raw optical fiber 11 receives no force from the push-up leaf spring 25. In consequence, the same action as the magnetic body 15 of Embodiment 1 can be accomplished.

The push-up leaf spring 25 may be made of a soft magnetic material in the same way as the leaf spring 16. It may also be a member of stainless steel to which a member of a soft magnetic material such as Permalloy is stuck. In addition, the leaf spring may be a member of stainless steel to which a permanent magnet is stuck. Further, a curvature may be given to the contact portion between the leaf spring 25 and the movable raw optical fiber 11 or a shock-absorbing member may be stuck to the contact portion in the same way as the leaf spring 16. Additionally, the leaf spring 16 and the push-up leaf spring 25 may be fabricated integrally with a press.

It is obvious that, in the present embodiment, the electromagnet may be arranged as shown in Embodiment 2.

In the present embodiment, it suffices that the push-up leaf spring 25 be adhesively bonded at a given location in the counterbore 17. Therefore, it is easier to assemble the optical switch than where the cylindrical magnetic body 15 is mounted in a given location on the movable raw optical fiber 11.

Embodiment 5

Figure 8A:
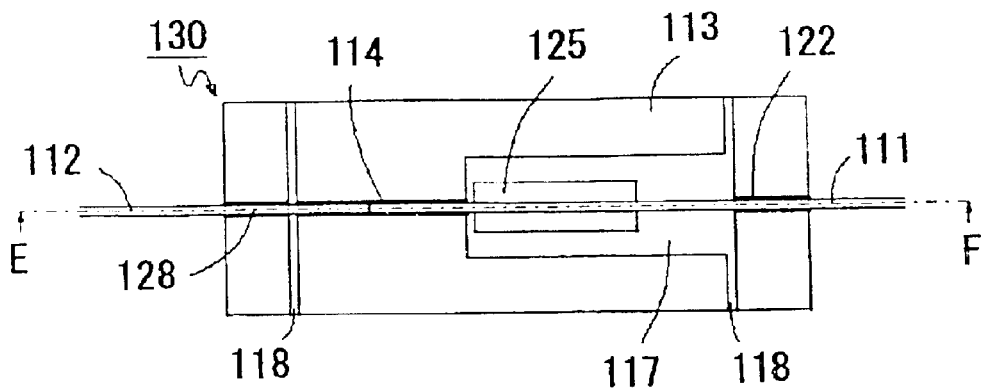
FIGS. 8A–8C are schematic views showing the structures of main portions of an optical switch according to Embodiment 5 of the invention.
Figure 8B:
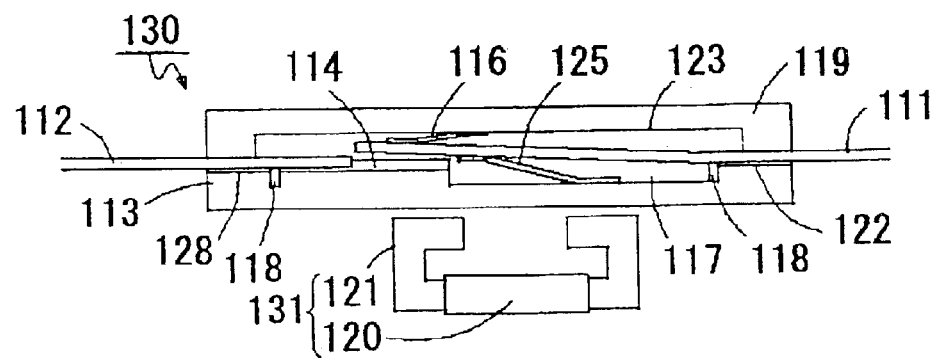
Figure 8C:
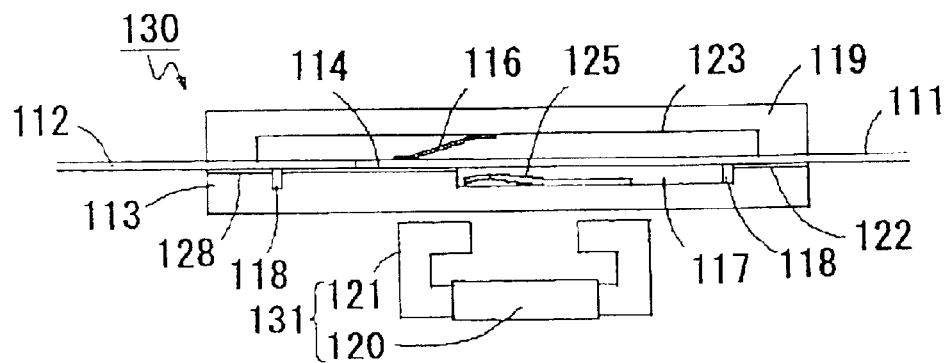

FIGS. 8A–8C show the structures of main portions of an optical switch according to Embodiment 5 of the present invention. FIG. 8A is a top view. FIGS. 8B and 8C are cross sections taken on line E–F of FIG. 8A. For simplicity, invisible components are omitted from these figures. The optical switch, generally indicated by reference numeral 130, has a support substrate or base 113 provided with a V-shaped groove 114 in its upper surface. A movable raw optical fiber 111 and a fixed raw optical fiber 112 are held inside the V-shaped groove 114 such that their end surfaces are close and opposite to each other. The movable raw optical fiber 111 has a portion 122 bonded to the support substrate 113 with resin or the like such that the movable raw optical fiber can cantilever. The fixed raw optical fiber 112 has a portion 128 bonded to the support substrate 113.

A push-up leaf spring 125 having desired spring constant and magnetic characteristics is firmly fixed in a counterbore 117 formed in the support substrate 113. This substrate 113 is provided with the V-shaped groove 114, the counterbore 117, and escape grooves 118. The movable raw optical fiber 111 and fixed raw optical fiber 112 are laid through the V-shaped groove 114. The counterbore 117 has sufficient width and depth to prevent the push-up leaf spring 125 from striking the support substrate 113 if the spring 125 resiliently deforms. The escape grooves 118 prevent adhesive such as resin from the bonded portion 122 of the movable raw optical fiber and from the bonded portion 128 of the fixed raw optical fiber from going its way to other than these bonded portions along non-straight routes.

An upper substrate or base 119 is mounted on the support substrate 113. An electromagnet 131 having a coil 120 and a core 121 is mounted below the support substrate 113. A leaf spring 116 having desired spring constant and magnetic characteristics is firmly held in a recess 123 formed in the upper substrate 119. The leaf spring 116 can push the vicinities of the front end of the movable raw optical fiber 111 toward the support substrate 113. The recess 123 is formed in the support substrate 113 to a given depth to prevent the operation of the movable raw optical fiber 111 and leaf spring 116 from being hindered.

With respect to each of the movable raw optical fiber 111 and fixed raw optical fiber 112, the plastic layer protecting the fiber core is removed over a given length from the front end to expose the raw fiber portion. This raw fiber portion is aligned along the V-shaped groove 114. The end surfaces of the fibers are formed at an angle to a plane vertical to the center axis of the core. The end surfaces of the fibers are placed parallel, opposite, and close to each other.

FIG. 8B shows the state in which the coil 120 is not electrically energized. At this time, the leaf spring 116 is not in contact with the movable raw optical fiber 111 or is in contact with it but pushes down the movable raw optical fiber 111 toward the support substrate 113 at small force. When the force of the push-up spring 125 is made sufficiently larger than the resilient force of the movable raw optical fiber 111, the leaf spring 125 pushes up the movable raw optical fiber 111 toward the upper substrate 119. Therefore, the cantilevered movable raw optical fiber 111 is bent upward. The front end of the movable raw optical fiber moves away from the V-shaped groove 114, thus cutting off the optical path.

FIG. 8C shows the state in which the coil 120 is energized with a given current. Magnetic attraction is exerted between the ends of the core 121 and each of the leaf spring 125 and leaf spring 116. If the magnetic attraction is sufficiently large, the resilient structures of the push-up leaf spring 125 and leaf spring 116 deform and are pulled down. Under this state, the push-up leaf spring 125 is not in contact with the movable raw optical fiber 111 or is in contact with it but pushes up the fiber toward the upper substrate 119 at small force. Therefore, the resilient force of the movable raw optical fiber 111 aligns it with the V-shaped groove 114. Furthermore, the front end of the movable raw optical fiber 111 is pushed into the V-shaped groove 114 by the leaf spring 116. The end surfaces of the movable raw optical fiber 111 and fixed raw optical fiber 112 are placed close and opposite to each other along the V-shaped groove 114. The movable raw optical fiber 111 and fixed raw optical fiber 112 are optically coupled, thus forming an optical path.

When the coil 120 is again deenergized, the magnetic attraction between the ends of the core 121 and each of the leaf spring 116 and push-up leaf spring 125 ceases. The push-up force of the push-up leaf spring 125 is greater than the resilient force of the movable raw optical fiber 111 and so the front end of the movable raw optical fiber 111 moves away from the V-shaped groove 114, thus cutting off the optical path. An optical switch is constructed in which the optical path can be easily established and cut off by electrically energizing and deenergizing the coil 120.

The magnetic attraction acting on the leaf spring 116 and push-up leaf spring 125 can be easily controlled by the current supplied into the coil 120. Therefore, the magnitude of the force urging the movable raw optical fiber 111 into the V-shaped groove 114 and the magnitude of the force pulling the fiber out of the V-shaped groove 114 can be easily controlled. Consequently, the optical effects of the optical switch produced by external vibrations can be reduced or otherwise controlled easily.

The push-up leaf spring 125 and leaf spring 116 are made of a soft magnetic material such as nickel or Permalloy. Since the leaf spring 116 and push-up leaf spring 125 are only required to resiliently deform in response to magnetic force from the electromagnet 131, it suffices that at least a part of each of these springs be made of a magnetic material. For instance, a minute plate made of a soft magnetic material such as Permalloy may be adhesively bonded either to the leaf spring 116 or to the push-up leaf spring 125 made of nonmagnetic stainless steel. Alternatively, a soft magnetic material may be formed as a film by evaporation or plating. Furthermore, it is obvious that each of these leaf springs is not limited to a leaf spring structure. Each leaf spring may have a resilient structure in a part thereof, and the resilient force of this structure moves or pushes the movable raw optical fiber 111 vertically to the support substrate.

Alternatively, each of the push-up leaf spring 125 and leaf spring 116 may consist of a member of a nonmagnetic stainless steel to which a permanent magnet is stuck. The electromagnet 131 may be disposed above the upper substrate 119, and magnetic repulsion may be used instead of magnetic attraction. Furthermore, instead of sticking a permanent magnet, it may be formed by a plating process. In addition, the leaf spring 116 and push-up leaf spring 125 may be fabricated integrally using a press.

Damage to the movable raw optical fiber 111 made of quartz can be prevented by forming contact portions near the front ends of the leaf spring 116 and push-up leaf spring 125 which come into contact with the movable raw optical fiber 111 and applying a load to the movable raw optical fiber 111 via the contact portions, which are formed by giving a curvature to the leaf spring 116 and push-up leaf spring 125 by plastically deforming them or sticking resilient members to them. Obviously, the leaf spring 116 may be fixed to the support substrate 113 instead of to the upper substrate 119.

Embodiment 6

Figure 9:
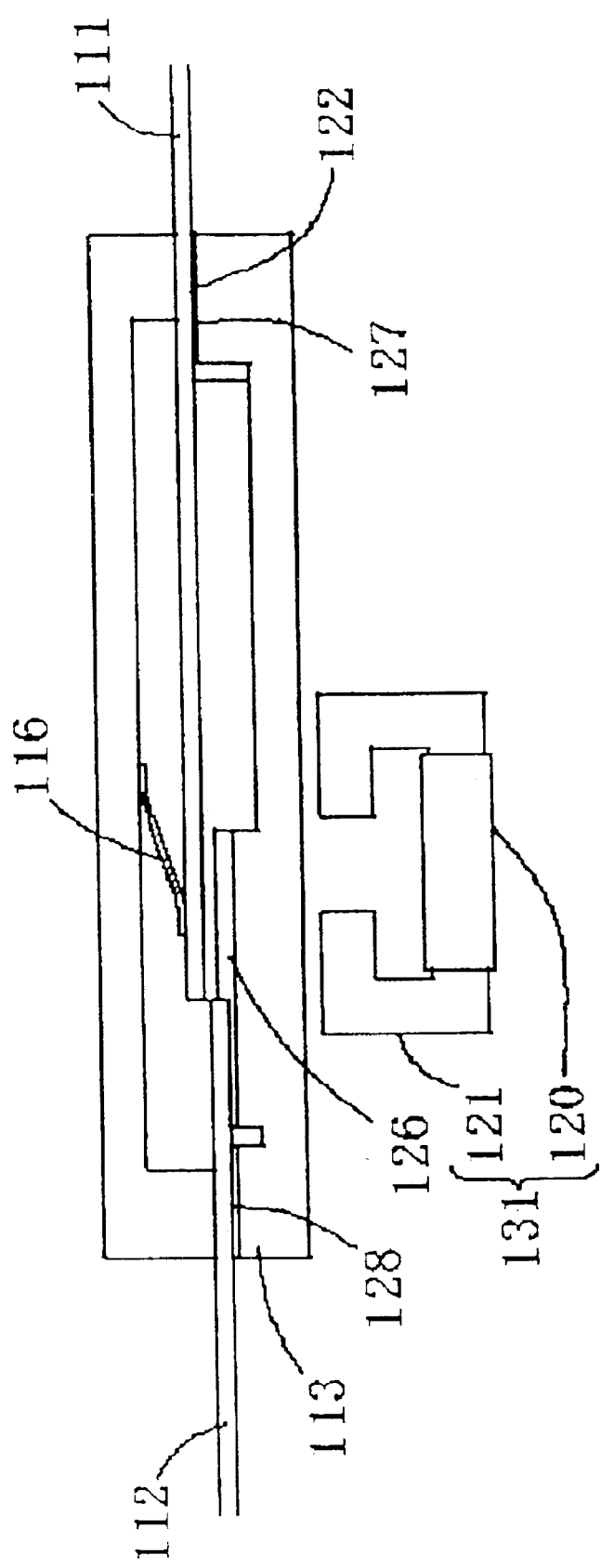
FIG. 9 is a schematic view showing the structure of main portions of an optical switch according to Embodiment 6 of the invention.

FIG. 9 is a cross-sectional view showing the structure of main portions of an optical switch according to Embodiment 6 of the present invention. In Embodiment 5, the movable raw optical fiber 111 and the fixed raw optical fiber 112 are aligned in the single V-shaped groove 114. In Embodiment 6, two V-shaped grooves having different depths are formed in the support substrate 113. This dispenses with the push-up leaf spring 125. Other structures are similar to those of Embodiment 5 and so their description will be omitted below.

In the support substrate 113, a thick plate portion and a thin plate portion having different thicknesses are formed within a plane. Two V-shaped grooves having desired depths are formed in each of the thick and thin plate portions. The fixed raw optical fiber 112 is held in the lower V-shaped groove 126 formed in the thin plate portion by a bonded portion 128 of the fixed raw optical fiber. The base portion of the movable raw optical fiber 111 is held in the higher V-shaped groove 127 formed in the thick plate portion by a bonded portion 122 of the movable raw optical fiber. The position relative to the support substrate 113 in the thickness direction is different between the bonded portion 122 of the movable raw optical fiber and the bonded portion 128 of the fixed raw optical fiber.

The movable raw optical fiber 111 is cantilevered in the higher V-shaped groove 127. When the coil 120 is not energized, the movable raw optical fiber receives no or small force from the leaf spring 116. Therefore, the front end of the movable raw optical fiber 111 moves away from the lower V-shaped groove 126, thus cutting off the optical path.

When the coil 120 is electrically energized, the leaf spring 116 receives magnetic attraction from the electromagnet 131 and pushes down the vicinities of the front end of the movable optical fiber 111 toward the support substrate 113. If this push-down force is greater than the resilient force of the movable raw optical fiber 111, this fiber 111 is bent downward and pressed into the lower V-shaped groove 126 by the leaf spring 116. The movable raw optical fiber 111 and fixed raw optical fiber 112 are aligned within the lower v-shaped groove 126 in such a way that the end surfaces of the fibers are spaced a given distance. Thus, an optical path is established.

When the coil 120 is deenergized, the magnetic attraction acting on the leaf spring 116 ceases and so the resilient force of the leaf spring 116 returns it to its original state. The spring no longer pushes down the movable raw optical fiber 111 toward the support substrate 113. Consequently, the movable raw optical fiber 111 is returned to its original state by its own resilient force. Its front end moves away from the lower V-shaped groove 126, thus cutting off the optical path.

In FIG. 9, the two V-shaped grooves have the same depth. The thickness of the support substrate 113 is different between the position of the lower V-shaped groove 126 and the position of the higher V-shaped groove 127. In this way, the height at which each raw optical fiber is fixed is varied. If the thickness of the support substrate 113 is fixed, a similar structure can be obtained by forming two V-shaped grooves of different depths, holding the fixed raw optical fiber 112 in the deeper V-shaped groove, and holding the movable raw optical fiber 111 in the shallower V-shaped groove.

The support substrate 113 having portions of different thicknesses and provided with the lower V-shaped groove 126 and higher V-shaped groove 127 can be readily formed from a crystal by anisotropic etching in the same way as the method described in Embodiment 1. The support substrate 113 having uniform thickness and provided with two V-shaped grooves of different depths can be easily fabricated similarly.

As described in this embodiment, a lift structure making use of the resilient force of optical fiber can be built simply by making different the positions of V-shaped grooves in the thickness direction and holding movable and fixed raw optical fibers without using the push-up leaf spring 125. In consequence, the number of components decreases. Members are machined, assembled, and adjusted in a shorter time. A high-performance optical switch can be offered at lower cost.

In the description of Embodiment 5 above, the movable raw optical fiber 111 and the leaf spring 116 are brought into contact with each other but not adhesively bonded together. Also, in the description of Embodiment 6 above, the movable raw optical fiber 111 and the push-up leaf spring 125 are brought into contact with each other but not adhesively bonded together. Where materials having different coefficients of thermal expansion such as glass and stainless steel are bonded together, it is difficult to assure good optical characteristics over a wide temperature range because warpage due to temperature variations affects the characteristics. Accordingly, if the movable raw optical fiber 111 and the leaf spring 116 are not bonded together, or if the movable raw optical fiber 111 and the push-up leaf spring 125 are not bonded together, better temperature characteristics would be obtained. However, where the used temperature range is narrow, or where materials only slightly different in coefficient of thermal expansion are used, they may be bonded together or firmly coupled together, because the temperature effect is small. In this case, the cantilevered portion of the movable raw optical fiber 111 is shorter and so the resonant frequency is higher. As a consequence, transient vibrations of optical fiber occurring when the current supplied into the coil is switched can be reduced in a shorter time.

Embodiment 7

Figure 10A:
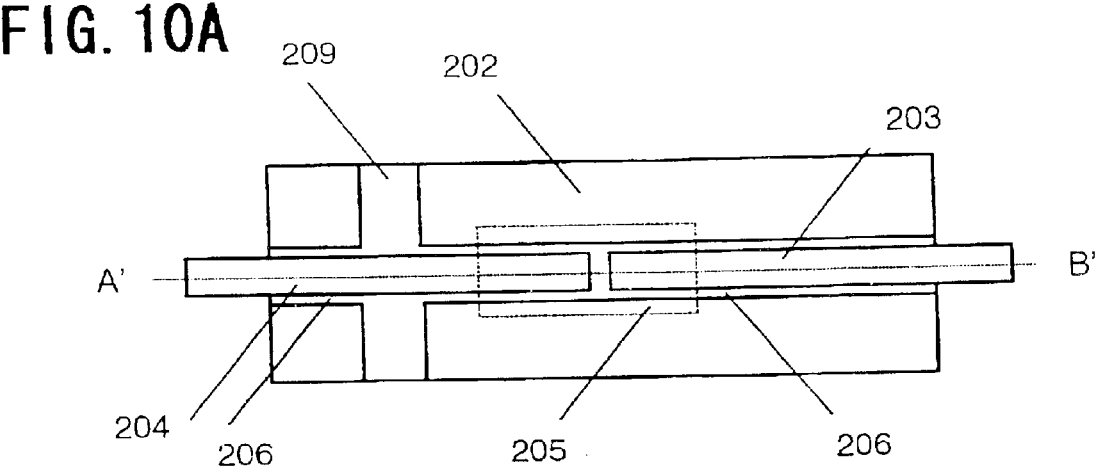
FIGS. 10A–10C are a schematic view, a cross-sectional view, and a side elevation, respectively, showing the structures of main portions of an optical switch according to Embodiment 7 of the invention.
Figure 10B:
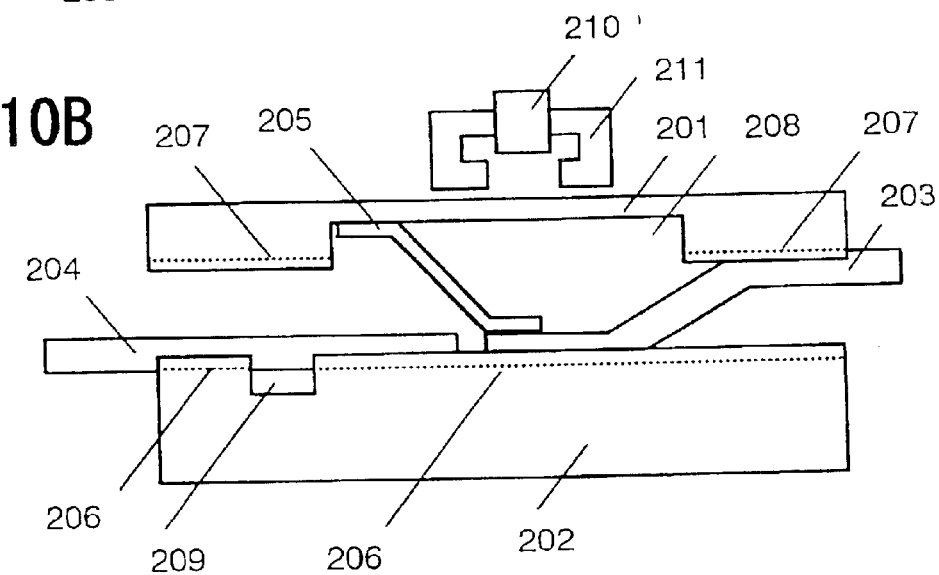
Figure 10C:
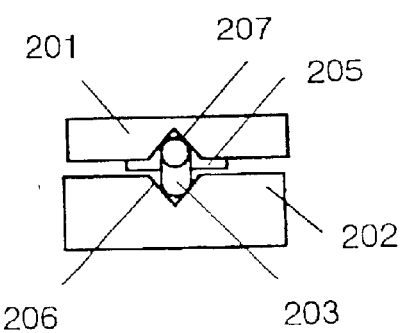

FIGS. 10A–10C show the structures of main portions of an optical switch according to Embodiment 7 of the invention. FIG. 10A is a top view of the switch. FIG. 10B is a cross-sectional view taken on line A'–B' of FIG. 10A. FIG. 10C is a side elevation as viewed from the side of a movable raw optical fiber 203. For simplicity, invisible structures are omitted in these figures. The vicinities of the front end of the movable raw optical fiber 203 and a fixed raw optical fiber 204 are disposed opposite to each other in a first V-shaped groove 206 formed in a surface of a support substrate 202 such that their end surfaces are close to each other. A part of the movable raw optical fiber 203 is held in a second V-shaped groove 207 using resin or the like such that the movable raw optical fiber 203 cantilevers. The front end of the movable raw optical fiber 203 is pushed into the first V-shaped groove 206 by a desired force of a leaf spring 205 having desired spring constant and magnetic characteristics The support substrate 202 is provided with escape grooves 209 to prevent adhesive such as resin from the bonded portions from going its way to other than the bonded portions in non-straight paths.

With respect to each of the movable raw optical fiber 203 and fixed raw optical fiber 204, the plastic layer protecting the optical fiber core is removed over a given length from the front end. Thus, the raw fiber portion is exposed. These raw fiber portions of the movable and fixed raw optical fibers are aligned in the first V-shaped groove 206. In addition, the end surfaces of the optical fibers are formed at an angle to a plane perpendicular to the direction of the center axis of the core. A given space is maintained between the end surfaces. Also, the end surfaces are placed substantially parallel and opposite to each other.

FIG. 10B shows the state in which an optical path has been established. An upper substrate 201 substantially parallel to the support substrate 202 is mounted. An electromagnet consisting of a coil 210 and a core 211 is mounted over the upper substrate. The upper substrate 201 has a recess 208 in which a part of the leaf spring 205 is firmly mounted. This leaf spring 205 presses the vicinities of the front end of the movable raw optical fiber 203 into the first V-shaped groove 206. FIG. 10B shows the state in which the coil 210 is not electrically energized. The movable raw optical fiber 203 and fixed raw optical fiber 204 are placed opposite to each other in the first V-shaped groove 206 in such a way that a given space is kept between the end surfaces of the fibers 203 and 204 and that the end surfaces are substantially parallel to each other. When the coil 210 is electrically energized, the leaf spring 205 is pulled toward the upper substrate 201 by a magnetic force and received in the recess 208. Accordingly, the vicinities of the front end of the movable raw optical fiber 203 are raised by the resilient force of the fiber itself, thus cutting of f the optical fiber.

In the present embodiment, the electromagnet is made up of the coil 210 and core 211. The core 211 has portions separated from the body, and is shaped cylindrically or otherwise polygonally and annularly. The space between the opposite ends of the core 211 is narrowed to attract the leaf spring 205 disposed close to the opposite ends. Magnetically speaking, therefore, the electromagnet is close to a closed circuit and the amount of magnetic field leaking to the surroundings is small. Therefore, plural optical switches can be disposed in proximity to each other. In addition, where the optical switches are magnetically shielded, for example, by covering them with Permalloy, the effects of the electromagnets of the adjacent optical switches can be prevented, even if the plural switches of the invention are disposed in proximity.

Where a part of the fixed raw optical fiber 204 is held inside the first V-shaped groove 206, the vicinities of the movable raw optical fiber 203 are pushed into the first V-shaped groove 206 by the leaf spring 205 when the coil 210 is not in an energized state. The movable raw optical fiber 203 and fixed raw optical fiber 204 are aligned in the first V-shaped groove 206, thus establishing an optical path. Where the fixed raw optical fiber 204 is held in the second V-shaped groove 207, the leaf spring 205 is pulled up toward the upper substrate 201 by a magnetic force and received in the recess 208 when the coil 210 is electrically energized. Accordingly, the movable raw optical fiber 203 and fixed raw optical fiber 204 are aligned along the second V-shaped groove 207, thus establishing an optical path. That is, an optical switch can be fabricated in which the operation to uninterrupt or interrupt the optical path in response to switching on or off of an electrical current is reversed, simply by modifying the arrangement of the fixed raw optical fiber 204.

Embodiment 8

Figure 11:
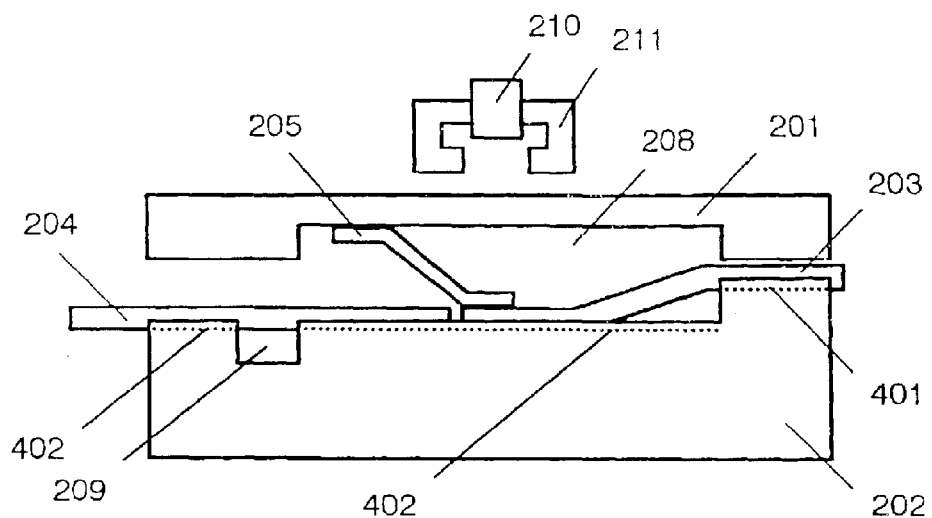
FIG. 11 is a cross-sectional view showing the structure of an optical switch according to Embodiment 8 of the invention.

FIG. 11 is a cross-sectional view showing the configuration of an optical switch according to Embodiment 8 of the present invention. The switch includes a resilient force-generating mechanism that has a support substrate 202 fitted with a stepped mechanism. The produced resilient force displaces the vicinities of the front end of the movable raw optical fiber 203 toward the upper substrate 201. A part of the movable raw optical fiber 203 is held in a third V-shaped groove 401 at an upper level of the support substrate 202. A fixed raw optical fiber 204 is held in a fourth V-shaped groove 402 at a lower level of the support substrate 202. FIG. 11 shows the state in which the coil 210 is not electrically energized. The vicinities of the front end of the movable raw optical fiber 203 are pushed into the fourth V-shaped groove 402 at the lower level of the support substrate 202 by the leaf spring 205. Accordingly, the movable raw optical fiber 203 and fixed raw optical fiber 204 are aligned in the fourth V-shaped groove 402, thus forming an optical path. When the coil 210 is electrically energized, the leaf spring 205 is pulled up toward the upper substrate 201 by a magnetic force and received in the recess 208. Consequently, the vicinities of the front end of the movable raw optical fiber 203 are raised by the resilient force of the optical fiber itself, thus cutting off the optical path.

It is obvious that an optical switch can be fabricated in which the switching operation for opening or closing an optical path in response to turning on or off of an electrical current is inverted, simply by modifying the arrangement of the fixed optical fiber 204 to an extension line to the third V-shaped groove 401 from the fourth V-shaped groove 402, in the same way as in Embodiment 7. Embodiment 8 is similar to Embodiment 7 except that a stepped structure is built in the support substrate 202. Embodiment 8 is identical with Embodiment 7 in operation and advantages.

Embodiment 9

Figure 12:
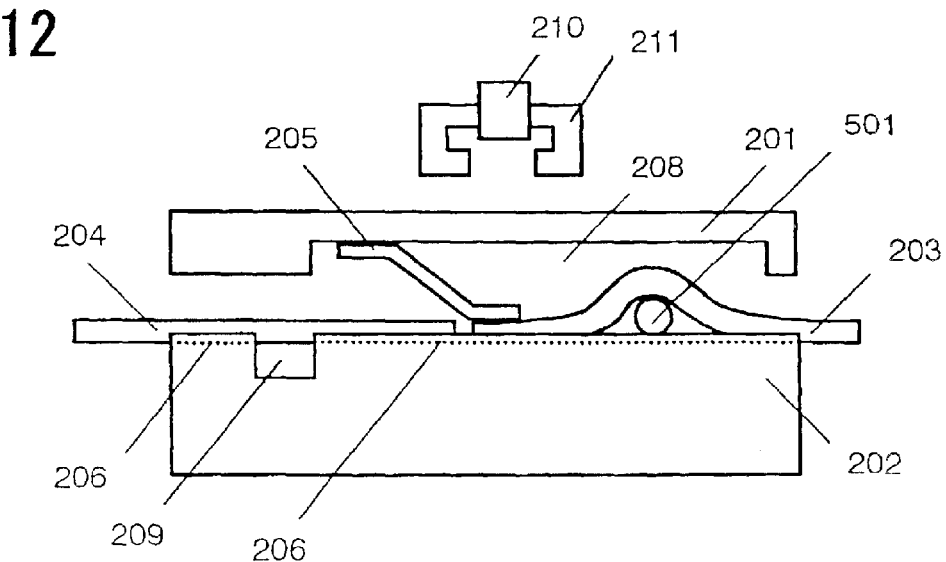
FIG. 12 is a cross-sectional view showing the structure of an optical switch according to Embodiment 9 of the invention.

FIG. 12 is a cross-sectional view showing the structure of an optical switch according to Embodiment 9 of the present invention. A first V-shaped groove 206 is formed in a surface of a support substrate 202. A protruding structure 501 is formed on the axis of the first V-shaped groove 206 to constitute a resilient force-generating mechanism. The produced resilient force displaces the vicinities of the front end of the movable raw optical fiber 203 toward the upper substrate 201. A part of the movable raw optical fiber 203 and a part of the fixed raw optical fiber 204 are held in the first V-shaped groove 206. FIG. 12 shows the state in which the coil 210 is not electrically energized. The movable raw optical fiber 203 is bent along the protruding structure 501. The vicinities of the front end of the movable raw optical fiber 203 are pushed into the first V-shaped groove 206 by the leaf spring 205. Accordingly, the movable raw optical fiber 203 and fixed raw optical fiber 204 are aligned in the first V-shaped groove 206, thus forming an optical path. When the coil 210 is electrically energized, the leaf spring 205 is pulled up toward the upper substrate 201 by a magnetic force and received in the recess 208. Therefore, the vicinities of the front end of the movable raw optical fiber 203 are raised by the resilient force of the fiber itself, thus cutting off the optical path.

Obviously, an optical switch can be fabricated in which the switching operation for uninterrupting or interrupting an optical path in response to turning on or off of an electrical current is inverted, simply by translating the fixed raw optical fiber 204 substantially perpendicularly to the support substrate 202 from the first V-shaped groove 206, in the same way as in Embodiment 7. Embodiment 9 is similar to Embodiment 7 except that the protruding structure 501 is formed on the support substrate 202. Embodiment 9 is identical with Embodiment 7 in operation and advantages.

Embodiment 10

Figure 13A:
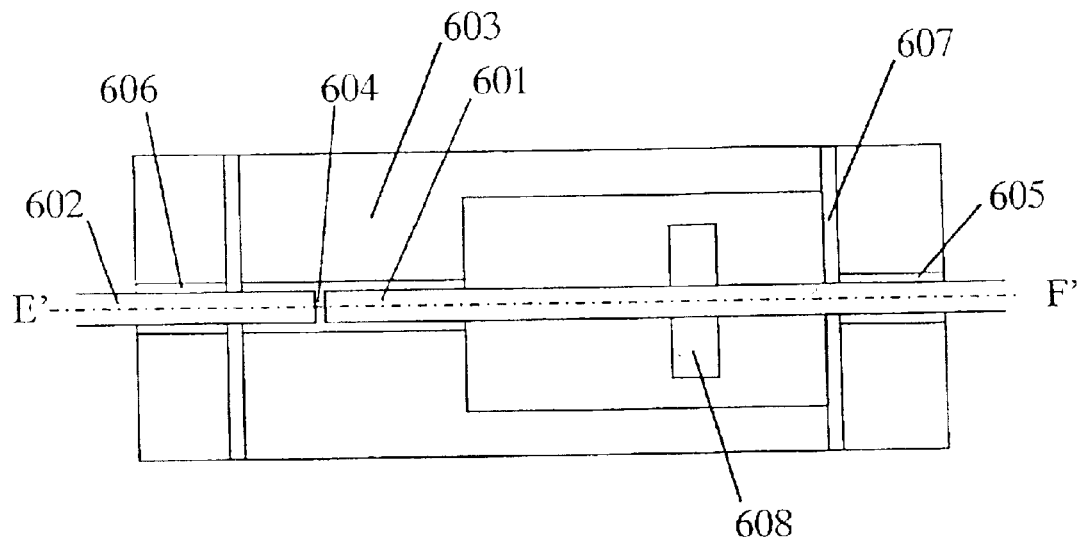
FIGS. 13A–13C are a top view, a side elevation, and another side elevation, respectively, showing the structures of main portions of an optical switch according to Embodiment 10 of the invention.
Figure 13B:
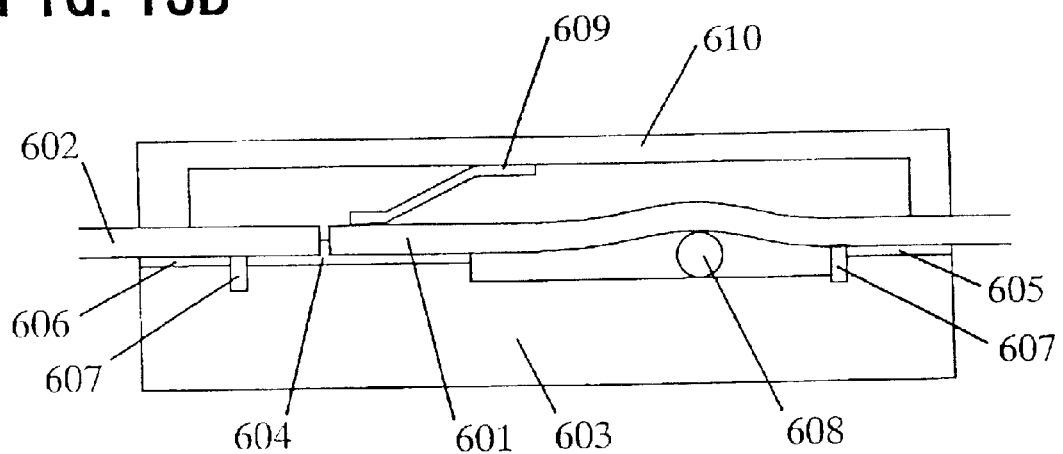
Figure 13C:
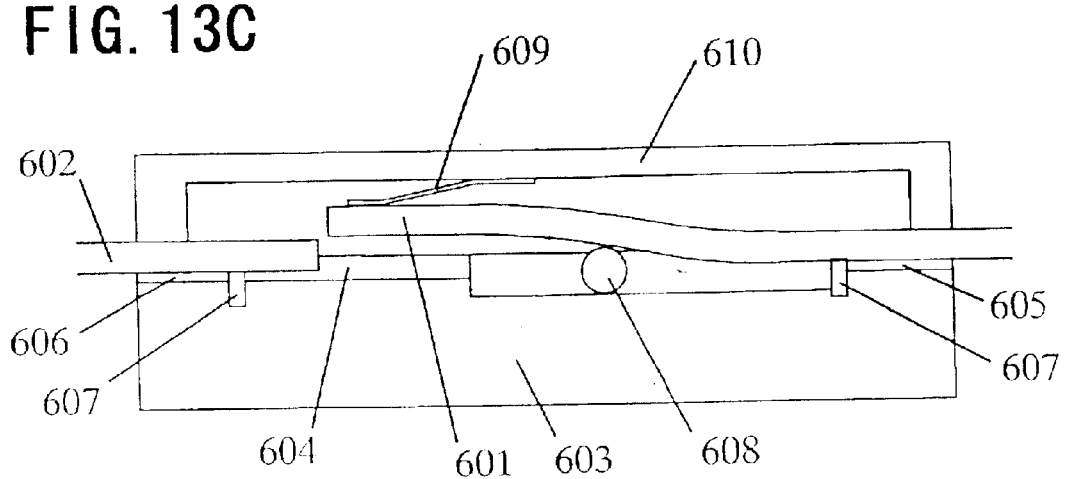

FIGS. 13A–13C show the structures of main portion of an optical switch according to Embodiment 10 of the present invention. FIG. 13A is a top view of the switch. FIGS. 13B and 13C are cross sections taken on line E'–F' of FIG. 13A. For simplicity, invisible components are omitted from these figures.

A V-shaped groove 604 is formed in the top surface of a support substrate or base 603. A movable raw optical fiber 601 and a fixed raw optical fiber 602 are held in the V-shaped groove 604 in such a way that their end surfaces are close and opposite to each other. The movable raw optical fiber 601 has a portion 605 that is bonded to the support substrate 603 by resin or the like such that the fiber cantilevers. The fixed raw optical fiber 602 has a portion 606 bonded to the support substrate 603. Escape grooves 607 are formed close to the bonded portion 605 of the movable raw optical fiber and to the bonded portion 606 of the fixed raw optical fiber to prevent adhesive such as resin from going its way to the bonded portions in non-straight paths. A push body 609 is mounted on the upper substrate 610 to push the vicinities of the front end of the movable raw optical fiber 601 into the V-shaped groove 604. A protruding member 608 acting as a drive mechanism is disposed between the movable raw optical fiber 601 and support substrate 603 to push up the movable raw optical fiber 601 at all times. The protruding member 608 can move longitudinally of the movable raw optical fiber 601.

With respect to each of the movable raw optical fiber 601 and fixed raw optical fiber 602, the plastic layer protecting the fiber core is removed over a given length from the front end to expose the raw fiber portion. The raw fiber portion is aligned along the V-shaped groove 604. The end surfaces of the fibers are formed at an angle to a plane vertical to the center axis of the core. The end surfaces of the fibers are placed parallel, opposite, and close to each other.

FIG. 13B shows the state in which the protruding member 608 is located remotely from the front end of the movable raw optical fiber 601. At this time, the movable raw optical fiber 601 is raised so as to cantilever by the protruding member 608. The portion between the protruding member 608 and the front end is long, and the spring constant is relatively small. Accordingly, the vicinities of the front end of the movable raw optical fiber 601 are aligned along the V-shaped groove 604 by the force at which the push body 609 pushes the front end of the movable raw optical fiber 601. The movable raw optical fiber is placed opposite to the fixed raw optical fiber 602, thus forming an optical path.

On the other hand, FIG. 13C shows the state in which the protruding member 608 has been moved close to the front end of the movable raw optical fiber 601. As the protruding member 608 is moved toward the front end of the movable raw optical fiber 601, the spring constant of the portion between the protruding member 608 and the front end of the movable raw optical fiber 601 increases. Also, the force at which the front end of the movable raw optical fiber 601 is raised increases. When the force at which the front end is raised becomes greater than the pushing force of the push body 609 acting on the front end of the movable raw optical fiber 601, the front end is raised as shown. Therefore, the optical path between the movable raw optical fiber 601 and fixed raw optical fiber 602 is cut off. In this way, an optical switch is constructed in which the optical path can be easily uninterrupted and interrupted by moving the protruding member 608.

The protruding member 608 can be made of various materials including silicon, glass, and plastic materials. In FIG. 13, the protruding member 608 is shown to assume a cylindrical form. No limitations are imposed on the shape, as long as the member is large enough to raise the movable raw optical fiber 601. However, the portion of the protruding member 608 that makes contact with the movable raw optical fiber 601 is preferably smooth to prevent damage to the movable raw optical fiber 601. The protruding member 608 can be driven by various driving means such as mechanical driving, electromagnetic driving, electrostatic driving, and piezoelectric driving.

In FIG. 13, the driving mechanism is shown to move the protruding member 608 longitudinally of the movable raw optical fiber 601. The movable raw optical fiber 601 can also be raised by inserting and withdrawing a wedge-shaped member between the movable raw optical fiber 601 and support substrate 603.

The push body 609 is made of a plastically deformable material such as metal spring materials (typified by stainless steel and phosphor bronze) and plastic materials. In the illustrated embodiment, the push body 609 in the form of a flat plate is shown but it is not limited to a leaf spring structure. It may also be a push body that has a resilient structure such as a coiled spring structure in a part thereof and moves or pushes the movable raw optical fiber 601 perpendicularly to the support substrate 603 by the resilient force of the resilient structure. That is, the push body 609 may be replaced by a non-contacting type push mechanism using a magnetic or electrostatic force.

As described thus far, the structure of the optical switch described above makes it possible to construct an optical switch in which the optical path can be easily established and cut off by shifting the protruding member 608 to displace the movable raw optical fiber 601 out of the V-shaped groove 604. Furthermore, since the movable raw optical fiber 601 is pressed into the V-shaped groove 604 by the push body 609, the front end of the movable raw optical fiber 601 is suppressed from vibrating within the V-shaped groove 604 in a transient state when the optical path is switched. As a result, quick switching can be accomplished. In addition, if vibrations are applied when an optical path has been formed, stable characteristics can be obtained since the optical path is not cut off.

Embodiment 11

Figure 14:
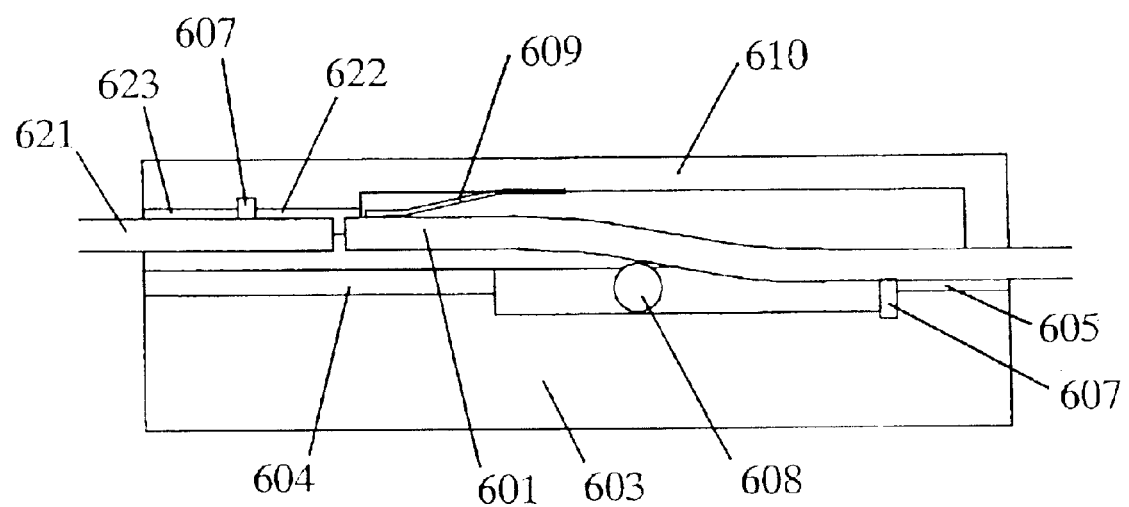
FIG. 14 is a schematic view showing the structure of main portions of an optical switch according to Embodiment 11 of the invention.

FIG. 14 is a cross-sectional view showing the structure of main portions of an optical switch according to Embodiment 11 of the present invention. This embodiment is different from the embodiment previously described in connection with FIGS. 13A–13C in that a fixed raw optical fiber 621 is fixed at a different position. The fixed raw optical fiber 621 has a portion 623 bonded to an upper substrate 610. Escape grooves 607 are formed near the bonded portion 623 of the fixed raw optical fiber to prevent adhesive such as resin from going its way to the bonded portion in non-straight paths. The movable raw optical fiber 601 and fixed raw optical fiber 621 are opposite to each other within a V-shaped groove 622 formed in the upper substrate 610.

As the protruding member 608 is moved toward the front end of the movable raw optical fiber 601, the spring constant of the portion between the protruding member 608 and the front end of the movable raw optical fiber 601 increases. Also, the force at which the front-end portion of the movable raw optical fiber 601 is raised increases. When the force at which the front-end portion is raised becomes greater than the force applied to the front-end portion of the movable raw optical fiber 601 by the push body 609, the front-end portion is raised and pressed into the V-shaped groove 622. Therefore, an optical path is formed between the movable raw optical fiber 601 and fixed raw optical fiber 621. In this way, the optical path is established or cut off depending on the direction of movement of the protruding member 608 in a reverse manner to Embodiment 10 already described in connection with FIGS. 13A–13C.

As described thus far, the structure of the optical switch described above makes it possible to construct an optical switch in which the optical path can be easily established and cut off by shifting the protruding member 608 to displace the movable raw optical fiber 601 toward the V-shaped groove 622. Embodiment 11 is similar to Embodiment 10 except that the optical path is established or cut off according to the direction of movement of the protruding member 608 in a reverse manner to Embodiment 10. That is, Embodiment 11 is identical in operation and advantages with Embodiment 10.

Embodiment 12

Figure 15A:
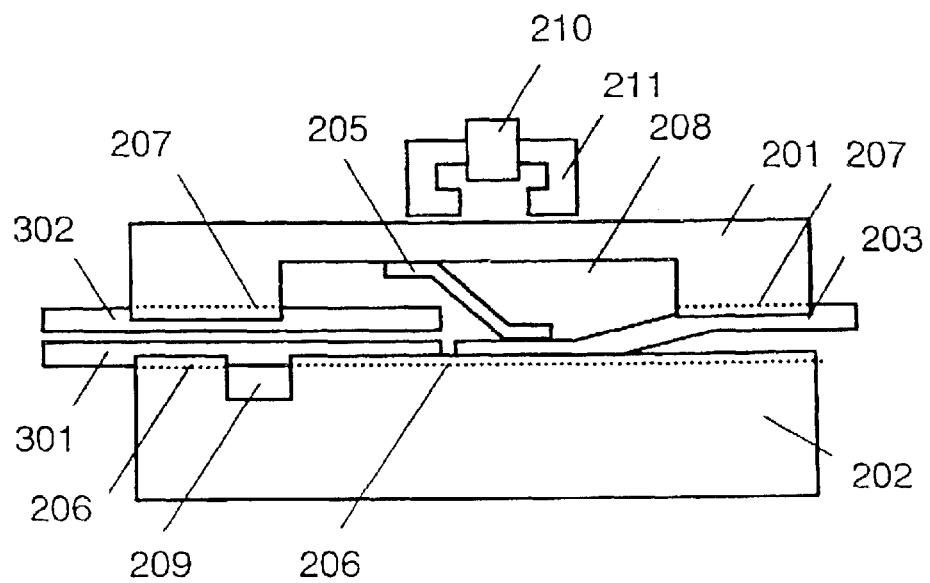
FIGS. 15A and 15B are cross-sectional views showing the structure and operation of an optical switch according to Embodiment 12 of the invention.
Figure 15B:
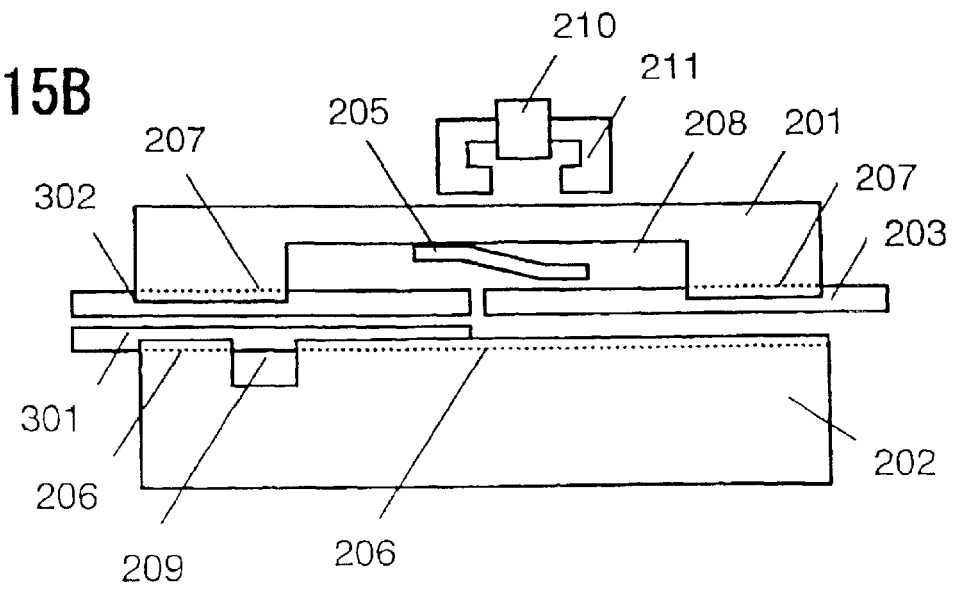

FIGS. 15A and 15B are cross-sectional views showing the structure of an optical switch according to Embodiment 12 of the present invention. In Embodiment 7, the single fixed raw optical fiber 204 is placed opposite to the single movable raw optical fiber 203. A 1×2 optical switch can also be constructed by holding a part of a first fixed raw optical fiber 301 in a first V-shaped groove 206 in the support substrate 202 and holding a part of a second fixed raw optical fiber 302 in a second V-shaped groove 207 in the upper substrate 201.

FIG. 15A shows the state in which a coil 210 is not electrically energized. No magnetic force acts on a leaf spring 205. Vicinities of the front end of the movable raw optical fiber 203 are pushed into the first V-shaped groove 206 by the leaf spring 205. The movable raw optical fiber 203 and first fixed raw optical fiber 301 are aligned in the first V-shaped groove 206, thus forming an optical path. FIG. 15B shows the state in which the coil 210 is electrically energized. The leaf spring 205 is pulled toward the upper substrate 201 by a magnetic force and received in a recess 208. Accordingly, the vicinities of the front end of the movable raw optical fiber 203 are raised by the resilient force of the fiber itself. The movable raw optical fiber 203 and second fixed raw optical fiber 302 are aligned in the second V-shaped groove 207, thus forming an optical path. This embodiment is similar to Embodiment 7 except that two fixed optical fibers are disposed and the optical path is switched by turning on and off the current. This embodiment is identical with Embodiment 7 in operation and advantages.

Embodiment 13

Figure 16:
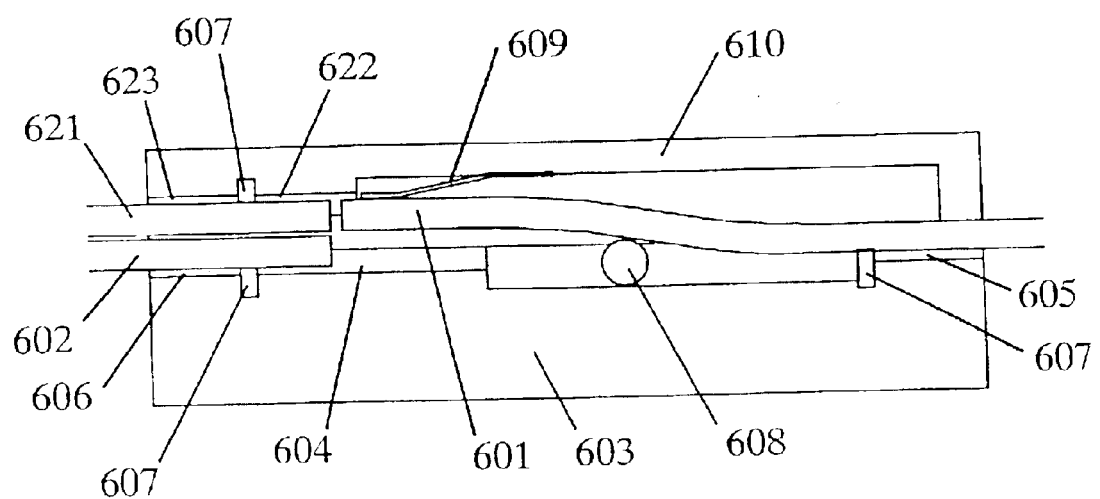
FIG. 16 is a schematic view showing the structure of the main portions of an optical switch according to Embodiment 13 of the invention.

FIG. 16 is a cross-sectional view showing the structure of main portions of an optical switch according to Embodiment 13 of the present invention.

This embodiment is different from the embodiment already described in connection with FIGS. 13A–13C in that two fixed raw optical fibers, i.e., first fixed raw optical fiber 602 and second fixed raw optical fiber 621, are positioned.

A movable raw optical fiber 601 and the first fixed raw optical fiber 602 are held in a V-shaped groove 604 formed in the upper surface of a support substrate 603 in such a way that their end surfaces are close and opposite to each other. The movable raw optical fiber 601 has a portion 605 bonded to the support substrate 603 by resin such that the movable raw optical fiber cantilevers. The first fixed raw optical fiber 602 has a portion 606 bonded to the support substrate 603. Escape grooves 607 are formed close to the bonded portion 605 of the fixed raw optical fiber and to the bonded portion 606 of the fixed raw optical fiber to prevent adhesive such as resin from going its way to other than the bonded portions in non-straight routes.

A push body 609 is placed on the upper substrate 610 and pushes the vicinities of the front end of the movable raw optical fiber 601 into the V-shaped groove 604. A protruding member 608 acting as a drive mechanism is disposed between the movable raw optical fiber 601 and support substrate 603 to push up the movable raw optical fiber 601 at all times. The protruding member 608 can move longitudinally of the movable raw optical fiber 601. The second fixed raw optical fiber 621 has a portion 623 fixed in a V-shaped groove 622 formed in the upper substrate 610. Escape grooves 607 are formed close to the bonded portion 623 of the fixed raw optical fiber to prevent adhesive such as resin from going its way to other than the bonded portion in non-straight routes. The movable raw optical fiber 601 and second fixed raw optical fiber 621 are designed to be placed opposite to each other within the V-shaped groove 622 formed in the upper substrate 610.

Where the protruding portion 608 is remote from the front end of the movable raw fiber 601, this movable raw optical fiber 601 is raised by the protruding member 608 so as to cantilever. The portion located between the protruding member 608 and the front end is long, and the spring constant is relatively small. Accordingly, the vicinities of the front end of the movable raw optical fiber 601 are aligned along the V-shaped groove 604 by the pushing force applied to the front-end portion of the movable raw optical fiber 601 by the push body 609. The vicinities of the front end are placed opposite to the first fixed raw optical fiber 602. Thus, an optical fiber is formed.

On the other hand, when the protruding member 608 is moved toward the front end of the movable raw optical fiber 601, the spring constant of the portion between the protruding member 608 and the front end of the movable raw optical fiber 601 increases. The force at which the front-end portion of the movable raw optical fiber 601 is raised is also increased. When the force at which the front-end portion is raised becomes greater than the pushing force applied to the front-end portion of the movable raw optical fiber 601 from the push body 609, the front-end portion is raised and pushed into the V-shaped groove 622. Consequently, an optical path is formed between the movable raw optical fiber 601 and second fixed raw optical fiber 621. In Embodiment 13, a 1×2 optical switch can be readily constructed.

As described thus far, the structure of the optical switch described above makes it possible to construct an optical switch in which the optical path can be easily switched by shifting the protruding member 608 to move the movable raw optical fiber 601 between the V-shaped grooves 604 and 622.

Embodiment 14

Figure 17:
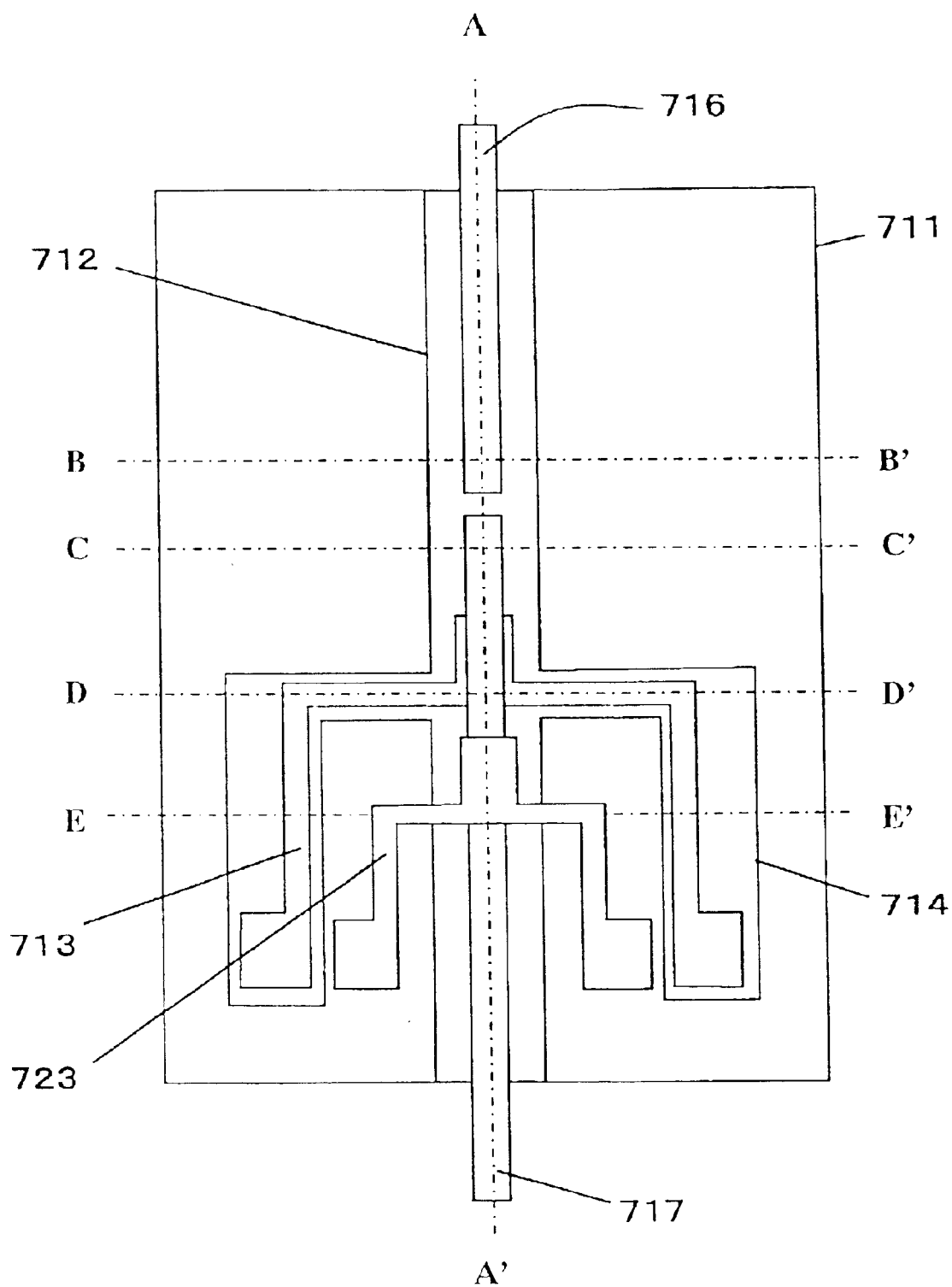
FIG. 17 is a schematic view showing main portions of a 1×2 optical switch according to Embodiment 14 of the invention.
Figure 18:
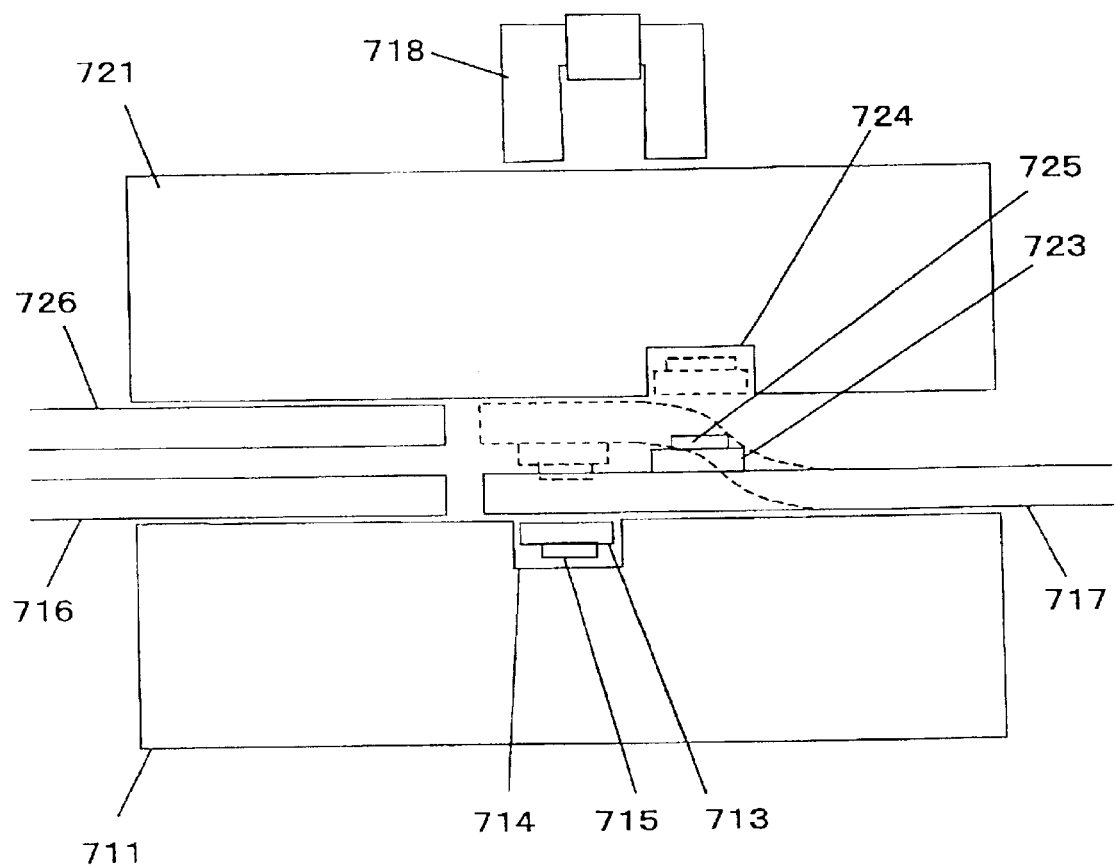
FIG. 18 is a cross-sectional view taken on line A–A' of FIG. 17, showing the 1×2 optical switch according to Embodiment 14 of the invention.

FIG. 17 is a schematic view as viewed from above the lower substrate, showing the structures of main portions of a 1×2 optical switch according to Embodiment 14 of the present invention. FIGS. 18–22 are cross sections taken on lines A–A' to E–E', respectively, of FIG. 17. In these figures, a cross section of an upper substrate located above the lower substrate is shown, in addition to a cross section of the lower substrate. The present optical switch is a 1×2 optical switch for switching the optical path from one input optical fiber (movable raw optical fiber) to either one of two output optical fibers (two fixed raw optical fibers) by moving the input fiber substantially perpendicularly to the substrate.

As can be seen from the cross sections of FIGS. 18–22, the optical switch consists of the upper substrate 721 and the lower substrate 711. The surfaces of the substrates which face each other are provided with V-shaped grooves parallel to each other. The lower substrate 711 is formed with a first V-shaped groove 712. A movable raw optical fiber 717 has a base portion held in the first V-shaped groove 712. The movable raw optical fiber 717 also has a front-end portion capable of cantilevering vertically to the lower substrate 711. A first fixed raw optical fiber 716 is also held in the first V-shaped groove 712 such that the end surfaces of the fibers 717 and 716 are close and opposite to each other. The upper substrate 721 is provided with a second V-shaped groove 722. A second fixed raw optical fiber 726 that is substantially coincident with the fixed raw optical fiber 716 in position along the optical axis is held in the second V-shaped groove 722 in a parallel relation to the first fixed raw optical fiber 716. Normally, the core of an optical fiber is clad with plastic. In this embodiment, an optical fiber obtained by peeling off the plastic cladding over a desired length from the front end to expose only a front-end portion is used. The unclad portion is inserted into the V-shaped groove.

A first recess 714 is formed in a part of the lower substrate 711. A first holding spring 713 having a fixed base portion is formed in the first recess 714. The first holding spring 713 has a front-end portion capable of moving substantially perpendicularly to the lower substrate 711. A second holding spring 723 having a base portion held on the surface of the lower substrate 711 is formed on the upper side of the movable raw optical fiber 717. The second holding spring 723 has a front-end portion capable of moving substantially perpendicularly to the lower substrate 711. Magnetic members 715 and 725 are mounted close to the front ends of the first holding spring 713 and second holding spring 723, respectively.

An electromagnet 718 is positioned on the surface of the upper substrate 721 that faces away from the surface provided with the second V-groove 722. For example, where this electromagnet 718 is made up of a core and a coil, a magnetic field can be produced around the magnetic members by electrically energizing the coil, so that magnetic attraction substantially perpendicular to the lower substrate 711 can be applied to it. This magnetic attraction moves the front ends of the first holding spring 713 and second holding spring 723 toward the position where the electromagnet is formed. At this time, the front-end portion of the movable raw optical fiber 717 is raised by a part of the front-end portion of the first holding spring 713 and moved toward the position where the electromagnet 718 is formed.

Figure 19:
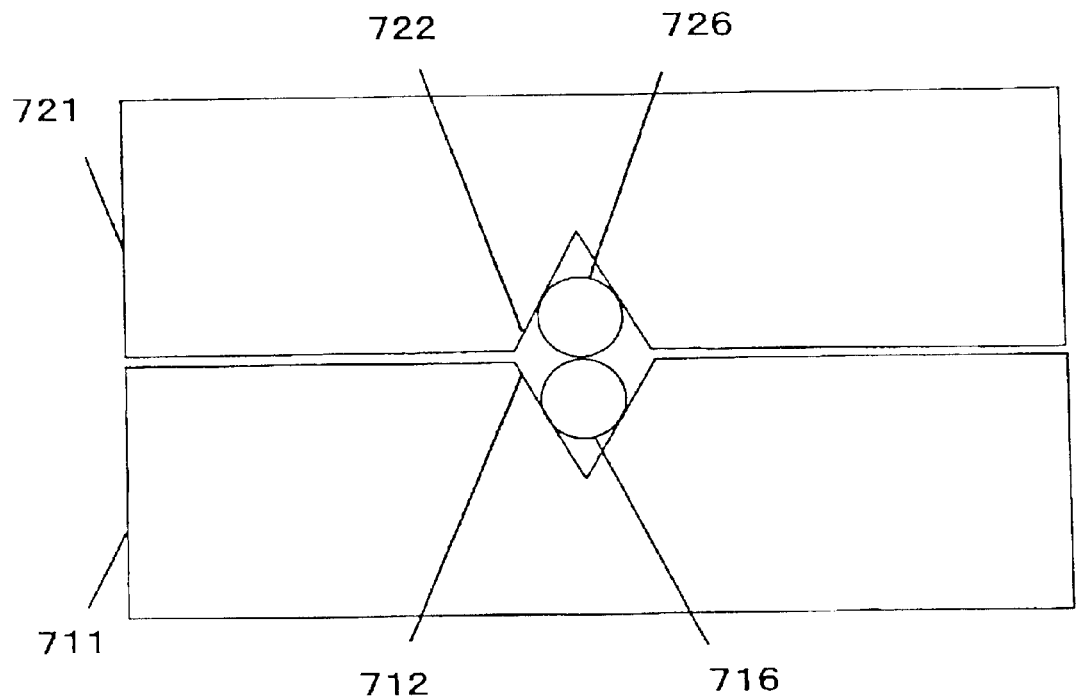
FIG. 19 is a cross-sectional view taken on line B–B' of FIG. 17, showing the 1×2 optical switch according to Embodiment 14 of the invention.
Figure 20:
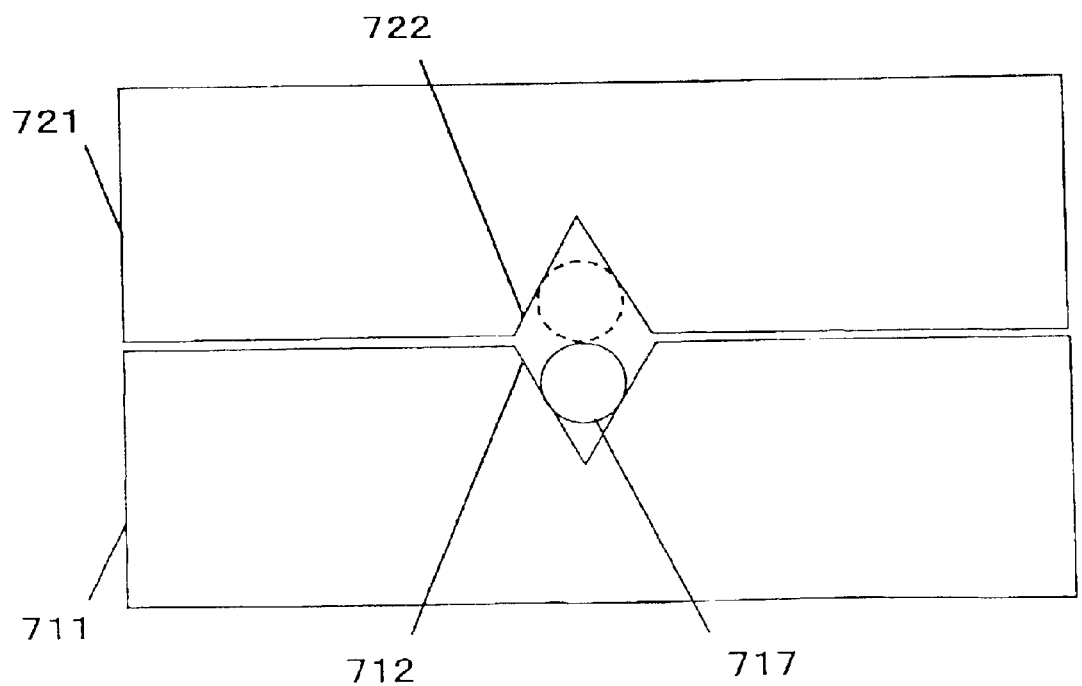
FIG. 20 is a cross-sectional view taken on line C–C' of FIG. 17, showing the 1×2 optical switch according to Embodiment 14 of the invention.
Figure 21:
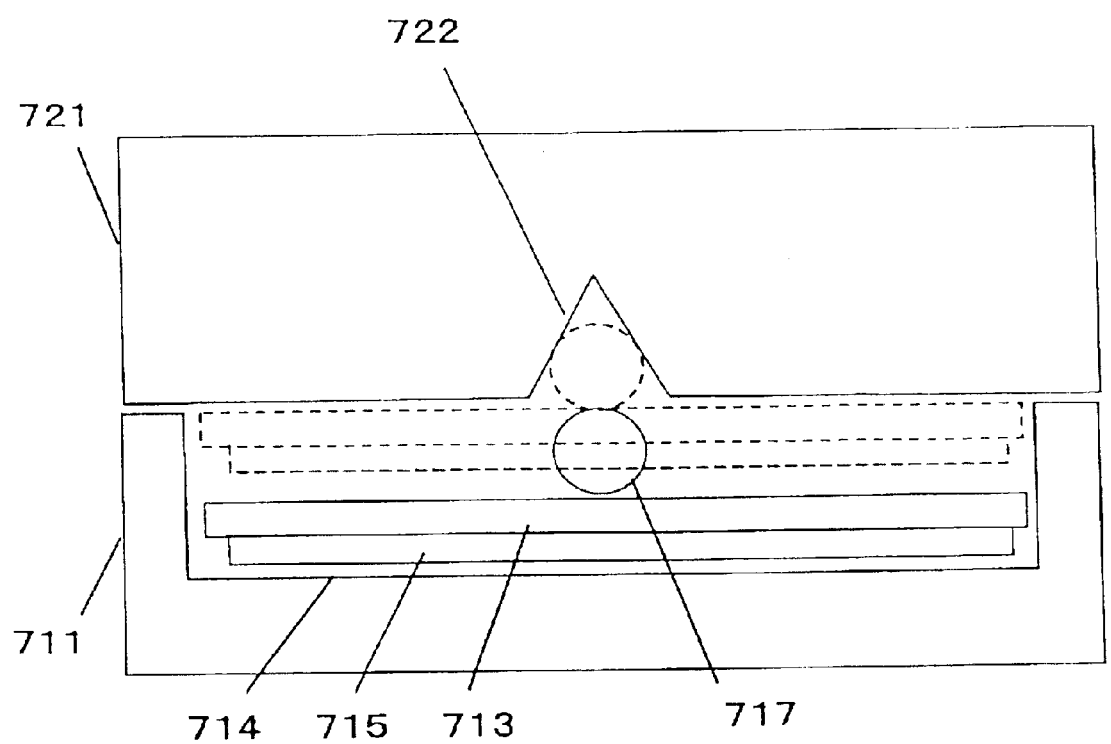
FIG. 21 is a cross-sectional view taken on line D–D' of FIG. 17, showing the 1×2 optical switch according to Embodiment 14 of the invention.
Figure 22:
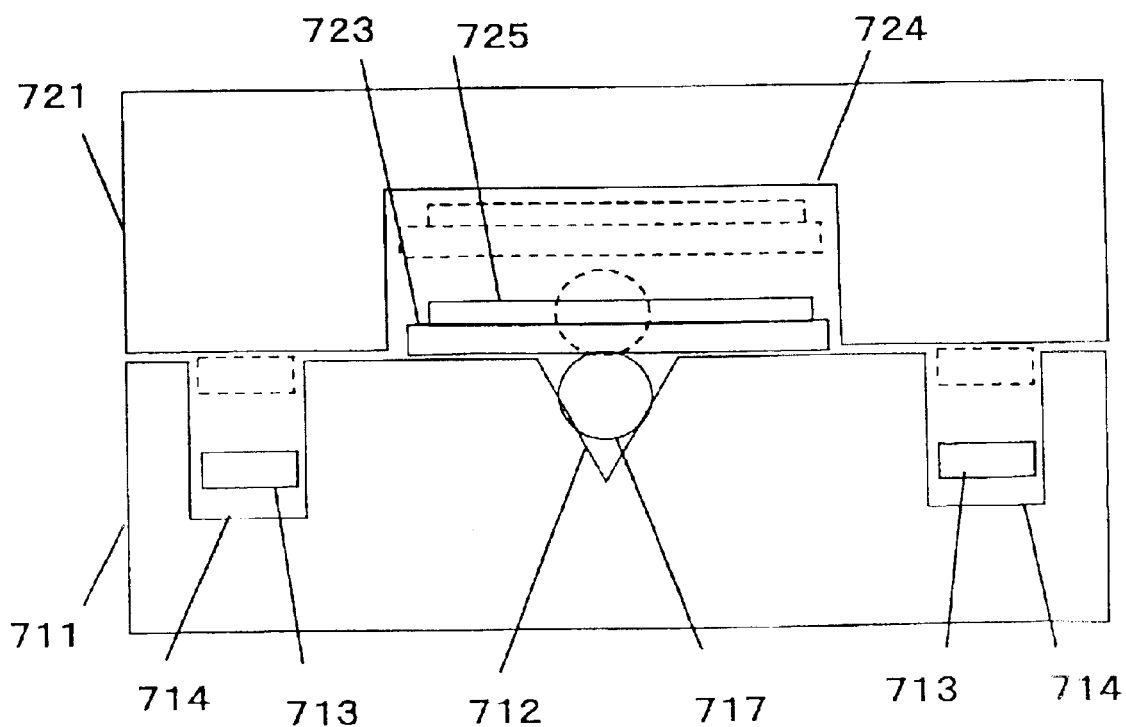
FIG. 22 is a cross-sectional view taken on line E–E' of FIG. 17, showing the 1×2 optical switch according to Embodiment 14 of the invention.

In the cross sections of FIGS. 18–22, the solid lines indicate the state in which the movable raw optical fiber 717 has been optically coupled to the first fixed raw optical fiber 716. The broken lines indicate the state in which the movable raw optical fiber 717 has been optically coupled to the second fixed raw optical fiber 726. When the coil is not electrically energized, i.e., when no magnetic attraction acts on the magnetic member 715 or 725, a load directed toward the lower substrate 711 is applied to the front-end portion of the movable raw optical fiber 717 from the front-end portion of the second holding spring 723 as shown in FIG. 22. The front-end portion of the movable raw optical fiber 717 is aligned along the first V-shaped groove 712 (FIG. 20). Where the first recess 714 has been formed to have a sufficient depth, the first holding spring 713 is received into the first recess 714 without contacting the movable raw optical fiber 717 (FIG. 21). The first fixed raw optical fiber 716 is positioned in the first V-shaped groove 712 such that the end surface of the first fixed raw optical fiber 716 is close to the end surface of the movable raw optical fiber 717 as shown in FIG. 19. Low-loss optical coupling is done between the two optical fibers whose end surfaces are close to each other within the same V-shaped groove.

On the other hand, where the coil is electrically energized, i.e., where magnetic attraction acts on the magnetic members 715 and 725, the front-end portion of the second holding spring 723 moves away from the lower substrate 711. The load directed toward the lower substrate 711 and applied to the front-end portion of the movable raw optical fiber 717 ceases. Furthermore, a force directed toward the upper substrate 721 is applied to the front-end portion of the first holding spring 713. Therefore, as shown in FIG. 21, the load from the front-end portion of the first holding spring 713 raises the front-end portion of the movable raw optical fiber 717. This front-end portion is pushed into the second V-shaped groove 722 formed in the upper substrate 721. Consequently, as shown in FIG. 20, the front-end portion of the movable raw optical fiber 717 is aligned along the second V-shaped groove 722 and optically coupled to the second fixed raw optical fiber 726. Where the second recess 724 is formed to have a sufficient depth as shown in FIG. 22, the front-end portion of the second holding spring 723 moved toward the second V-shaped groove 722 does not come into contact with the movable raw optical fiber 717.

In the optical switch described above, where air exists between the end surface of the movable raw optical fiber 717 and any one of the two fixed raw optical fibers 716 and 726, it is necessary to reduce the distance between the end surfaces to below about 20 μm to reduce the insertion loss. In addition, surface reflection occurs because of a difference in refractive index at the ends of the optical fibers. This increases the insertion loss and return loss. Accordingly, it is desired to coat the end surfaces with antireflective film. Furthermore, each end surface is preferably formed at an angle of 5 to 8 degrees to the plane perpendicular to the optical axis in order to reduce the return loss. In this case, optical axis deviation occurs due to refraction at the end surfaces of the optical fibers, increasing the insertion loss. Accordingly, two parallel V-shaped grooves permitting optical fibers to be positioned in a corresponding manner to the optical axis deviation are formed instead of placing the optical fibers in a single V-shaped groove. The reflection loss and insertion loss can also be reduced by filling the space between the end surfaces with a refractive index matching liquid.

The first holding spring 713 and second holding spring 723 are made of a resilient material. The magnetic members 715 and 725 are directly stuck to the vicinities of the front ends of the first and second holding springs 713 and 723, respectively. The magnetic members 715 and 725 may also be fabricated by a thin-film deposition method such as vacuum deposition or sputtering or by plating. Alternatively, the first and second holding springs 713, 723 themselves may be made of a magnetic material.

Each of the upper substrate 721 and lower substrate 711 is made of a single crystal of Si having crystallographic axes or glass. Where a single crystal of Si is used, it is immersed in a liquid that shows anisotropic etch rate according to the crystallographic orientation, thus promoting the etching. In this way, accurate V-shaped grooves can be made. For example, where a (100)-oriented single crystal Si wafer is used, a V-shaped groove having a (111)- or (110)-oriented side surface can be formed. These surfaces have a given angle to the (100)-oriented plane on the wafer surface. Therefore, where a photolithography technique capable of processing an etch mask accurately is used in conjunction, accurate V-shaped grooves can be formed. Where the substrate is made of the same glass as the optical fibers, an excellent optical switch can be fabricated. That is, none of insertion loss, reflection loss, and polarization dependence characteristics of the switch depend on temperature variations over a wide temperature range because the materials are coincident in coefficient of thermal expansion. The V-shaped grooves are formed by mechanically machining the substrate surface. For example, a cutting blade is rotated at a high speed and scanned in the direction of rotation during cutting operation. In this way, a groove having a shape obtained by transferring the cross-sectional shape of the blade can be formed. Side surfaces of any desired tilt can be easily formed by controlling the taper angle of the blade. V-shaped grooves of various shapes can be machined.

As described thus far, in the above-described optical switch, the holding spring is moved by energizing or deenergizing the coil of the electromagnet. The holding spring applies a load on a fiber, which in turn is pressed into a V-shaped groove. In this way, light can be switched between two optical fibers. Because of such a relatively simple structure, it is easy to perform an adjustment during assembly. Hence, a high-performance optical switch can be offered at low cost. In addition, upper and lower substrates that are main components can be supplied from Si or glass wafer with high mass productivity.

Embodiment 15

Figure 23:
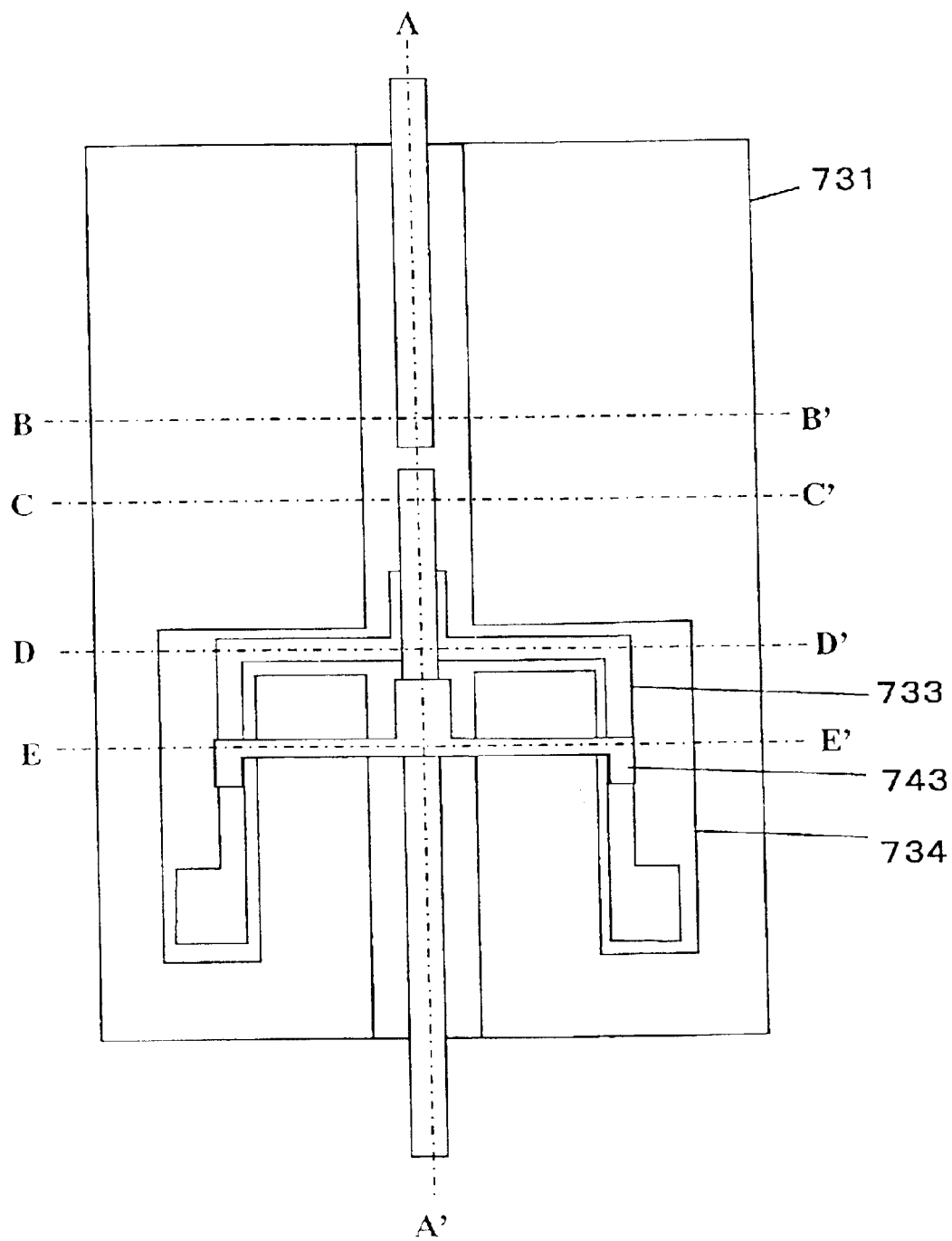
FIG. 23 is a schematic view showing main portions of a 1×2 optical switch according to Embodiment 15 of the invention.
Figure 24:
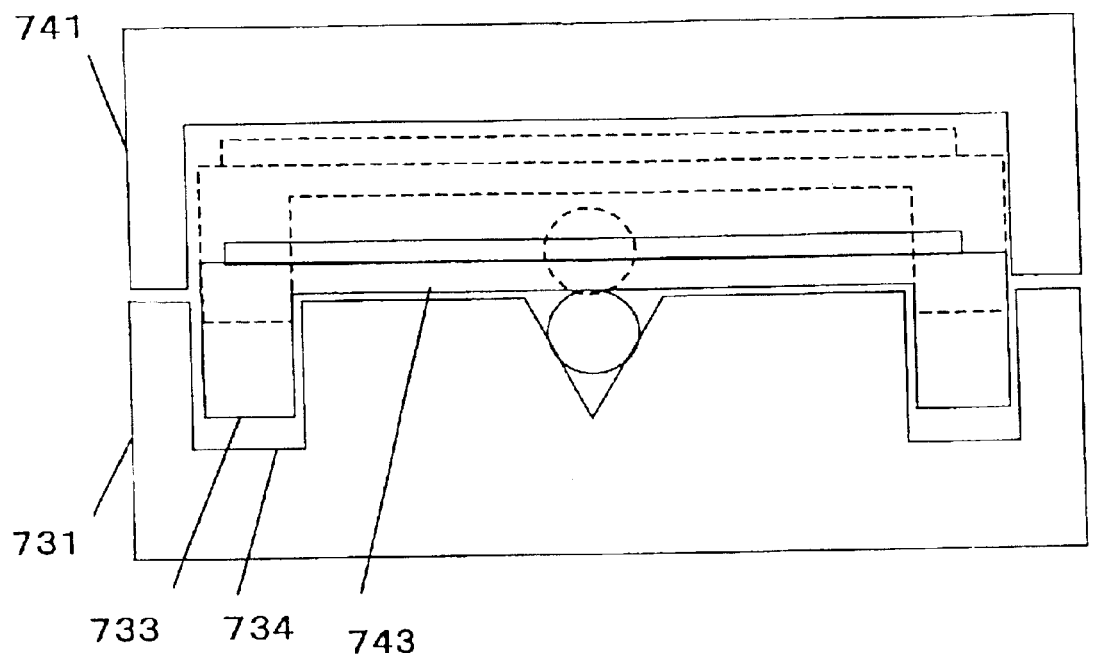
FIG. 24 is a cross-sectional view taken on line E–E' of FIG. 23, showing the 1×2 optical switch according to Embodiment 15 of the invention.

FIG. 23 is a schematic view as viewed from above a lower substrate 731, showing the structure of main portions of a 1×2 optical switch according to one embodiment of the present invention. Cross sections taken on lines A–A' to D–D' of FIG. 23 are similar to FIGS. 18–21 showing the 1×2 optical switch according to Embodiment 14. A cross section taken on line E–E' is shown in FIG. 24. In these cross sections, a cross section of an upper substrate 741 held over the lower substrate 731 is included, as well as the lower substrate 731. The fundamental structure of the optical switch according to the present embodiment is similar to the optical switch according to Embodiment 14 except that first and second holding springs are fabricated integrally. The first holding spring 733 has a base portion held in a first recess 734 formed in the lower substrate 731 in the same way as in the optical switch according to Embodiment 14. However, the second holding spring 743 has a base portion connected with a part of the first holding spring 733. When the first holding spring 733 moves, the second holding spring 743 interlocks with it. This integrated holding spring subassembly can be easily fabricated by pressing where stainless steel is used, for example. Therefore, the number of components can be reduced. In addition, assembly and adjustment costs can be curtailed. The cost of the optical switch can be reduced further.

Embodiment 16

Figure 25:
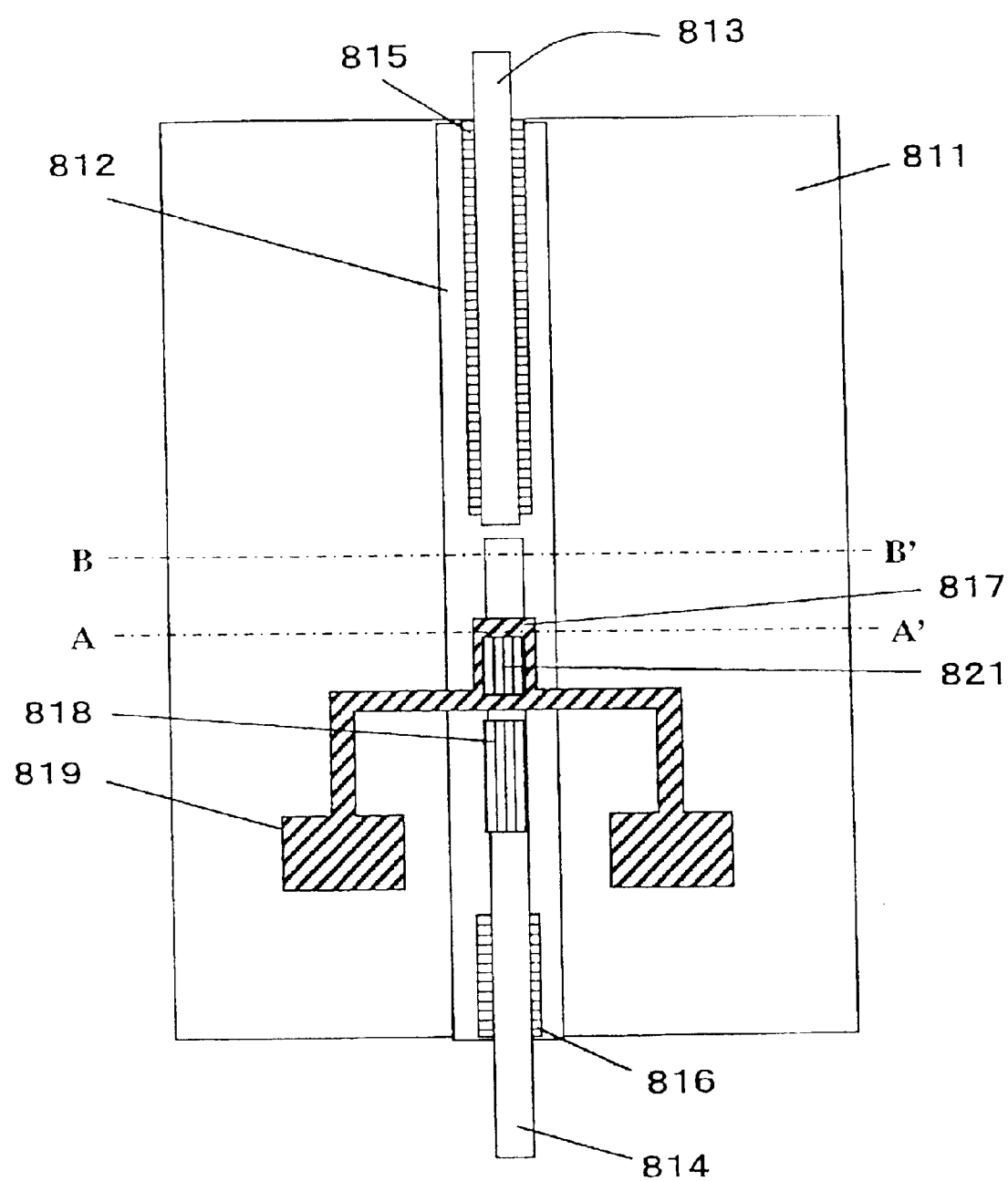
FIG. 25 is a top view of an optical switch according to Embodiment 16 of the invention.
Figure 26:
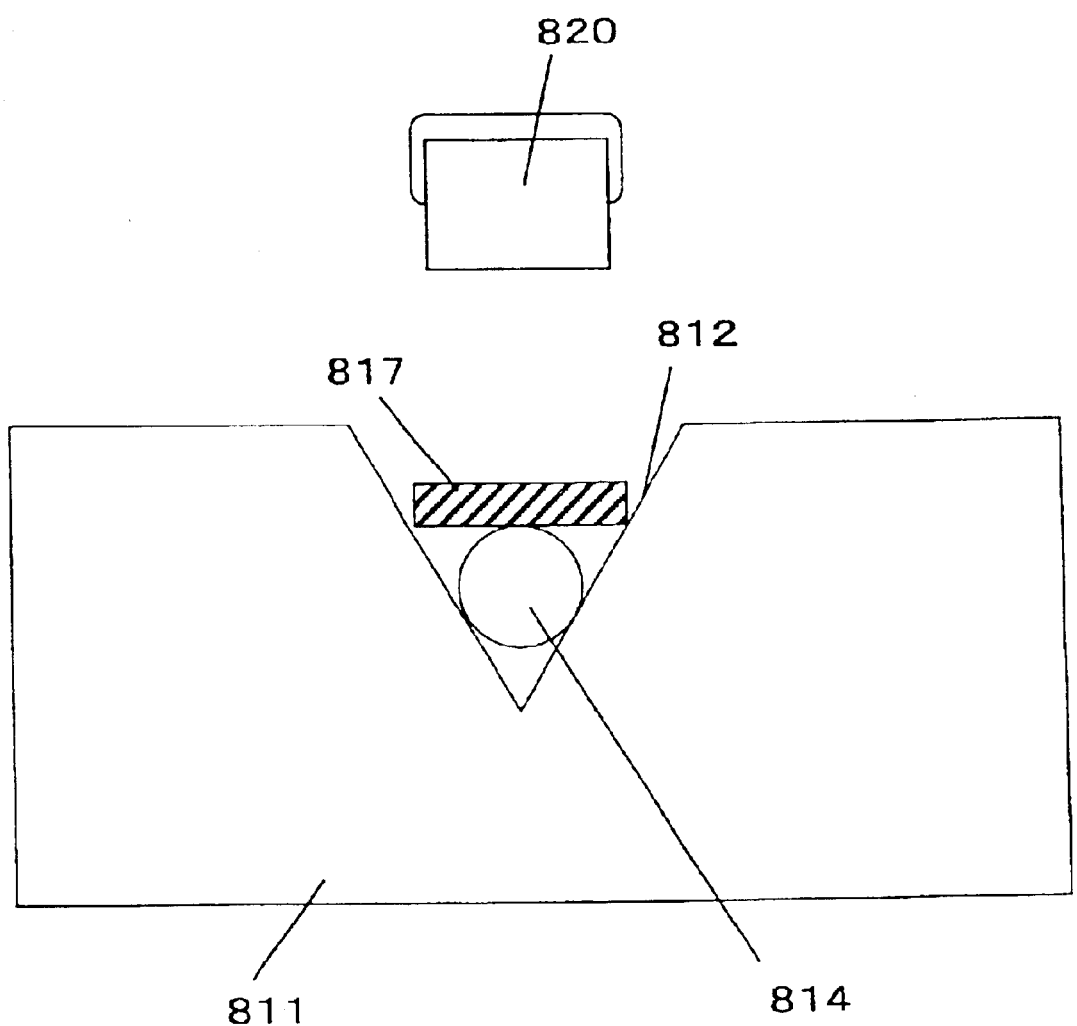
FIG. 26 is a cross-sectional view taken on line A–A' of FIG. 25 that is a top view of the optical switch according to Embodiment 16 of the invention.
Figure 27:
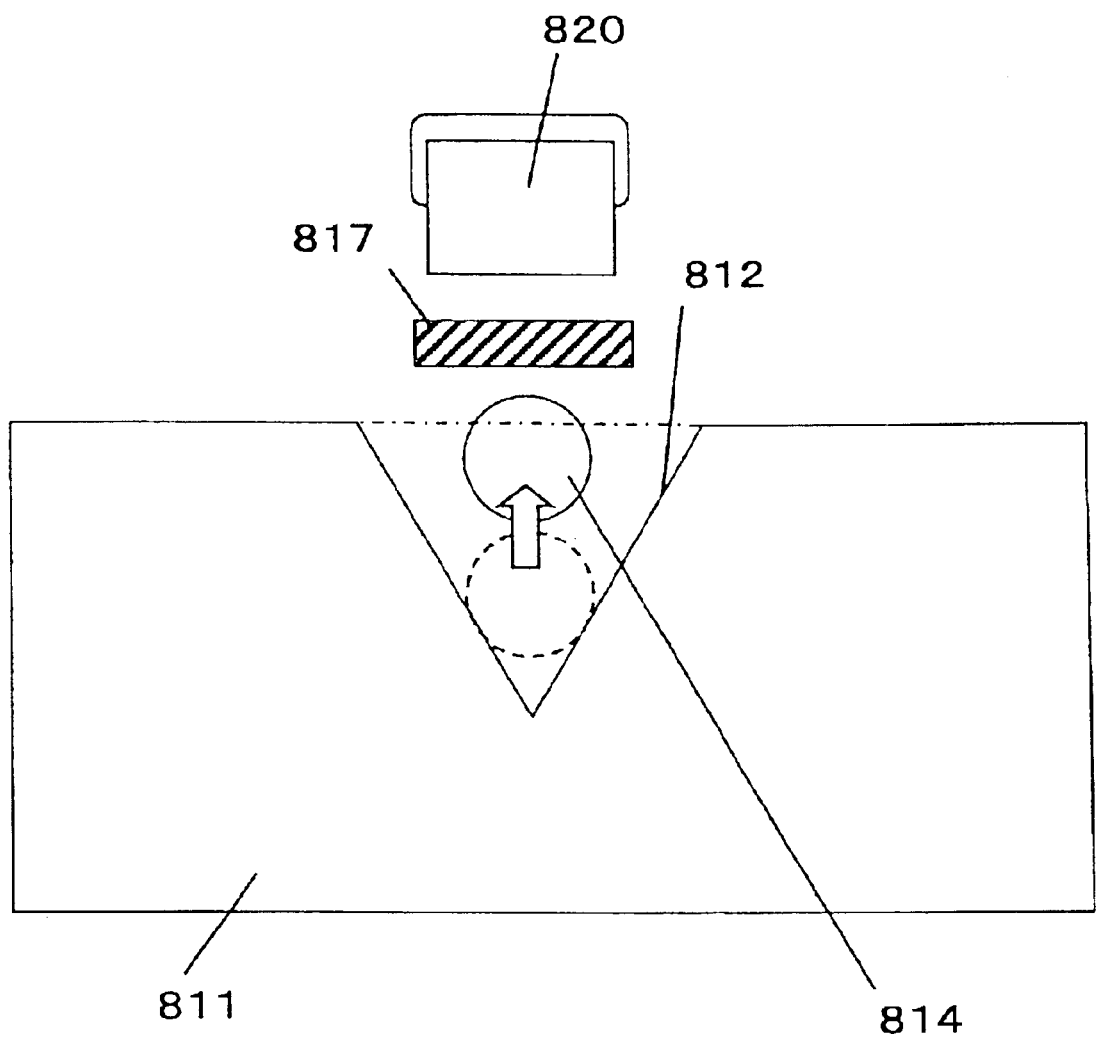
FIG. 27 is a cross-sectional view taken on line A–A' of FIG. 25 that is a top view of an optical switch according to Embodiment 16 of the invention.

An optical switch according to Embodiment 16 of the present invention is first described by referring to FIGS. 25–27. FIG. 25 is a top view of the optical switch according to Embodiment 16. This switch has a substrate 811 provided with a V-shaped groove 812. Two opposite raw optical fibers are positioned in the V-shaped groove 812 in such a way that their end surfaces are close to each other. One of the two raw optical fibers is a fixed raw optical fiber 813, while the other is a movable raw optical fiber 814. Normally, an optical fiber is coated with a plastic layer to protect the cladding against external damage. The plastic layer is removed over a given length from the front end to expose a front-end portion. This exposed optical fiber portion is inserted into the V-shaped groove. The fixed raw optical fiber 813 has a portion 815 that is in contact with both side surfaces of the V-shaped groove 812 and bonded to these side surfaces with adhesive.

The opposite movable raw optical fiber 814 has a base portion that is in contact with both side surfaces of the V-shaped groove 812 in the bonded portion 816 of the fiber and bonded to these side surfaces with adhesive. The movable raw optical fiber can cantilever. A pressure application body 817 is positioned above the movable raw optical fiber 814 and has a portion 819 bonded to the substrate. The pressure application body 817 has a spring structure and can move vertically to the substrate. A load is applied to the end of the movable raw optical fiber 814 in the direction of depth of the V-shaped groove 812 by the pressure application body 817, so that the end of the movable raw optical fiber 814 is in contact with the surfaces on both sides of the V-shaped groove 812. Accordingly, the fixed raw optical fiber 813 and movable raw optical fiber 814 are both in contact with both side surfaces of the V-shaped groove 812 and optically coupled between the two optical fibers.

A semicylindrical magnetic member 818 is mounted on the opposite side of the substrate 811 near the end of the movable raw optical fiber 814. A magnetic member 821 is mounted on a part of the pressure application body 817 that applies a load on the movable raw optical fiber 814. These magnetic members 818 and 821 may be fabricated by a thin-film deposition method such as vacuum deposition or sputtering or directly stuck. An electromagnet (not shown in FIG. 25) is disposed above the substrate 811. This electromagnet is made up of a coil and a core, for example. A magnetic field is set up around the magnetic members 818 and 821 by electrically energizing the coil. As a result, magnetic attraction vertical to the substrate can be applied.

FIG. 26 is a cross section taken on line A–A' of FIG. 25 when the coil is not electrically energized. The end of the movable raw optical fiber 814 is brought into contact with both side surfaces of the V-shaped groove 812 by a load applied by the pressure application body 817. Consequently, the end surfaces of the fixed raw optical fiber 813 and movable raw optical fiber 814 are placed opposite to each other and thus the two fibers are optically coupled. FIG. 27 is a cross section taken on line A–A' of FIG. 25 under the condition where the electromagnet 820 is energized to produce a magnetic field around the magnetic members 818 and 821. Magnetic attraction acts between the electromagnet 820 and each of the magnetic member 818 and pressure application body 817. The front end of the movable raw optical fiber 814 on which the magnetic member 818 is formed and the front end of the pressure application body 817 on which the magnetic member 821 is formed are pulled up. This releases the front end of the movable raw optical fiber 814 from the load applied by the pressure application body 817. In addition, the magnetic member 818 is pulled up and thus the front end of the movable raw optical fiber 814 is moved upward. As a result, the optical path to the fixed raw optical fiber 813 is cut off. Furthermore, when the coil is deenergized, the magnetic attraction acting on the magnetic members 818 and 821 ceases. The resilient force of the movable raw optical fiber 814 and pressure application body 817 urges the movable raw optical fiber 814 into the V-shaped groove again. The load from the pressure application body 817 returns the fiber into contact with both side surfaces of the V-shaped groove 812. Consequently, the optical path to the fixed raw optical fiber 813 is again established.

In order to reduce crosstalk sufficiently without permitting optical coupling between the movable raw optical fiber 814 moved above the substrate and the fixed raw optical fiber 813, it is necessary to set the amount of movement made by the front end of the movable raw optical fiber 814 to a sufficiently large value. Where the end surface of the movable raw optical fiber 814 has moved upward and completely away from the surface of the substrate 811, the magnetic attraction ceases and the movable raw optical fiber 814 returns into the V-shaped groove 812. At this time, gravity and the pressure application body 817 apply a horizontal load to the surface of the substrate 811. The movable raw optical fiber 814 may be squeezed between the surface of the substrate 811 and the pressure application body 817. In this case, the movable raw optical fiber does not return into the V-shaped groove 812. To assure that the movable raw optical fiber 814 returns into the V-shaped groove 812 and is optically coupled to the fixed raw optical fiber 813 even if the amount of movement made by the front end of the movable raw optical fiber 814 is large, the center of the end surface of the shifted movable raw optical fiber 814 is prevented from being located above the surface of the substrate 811. This prevents the possibility that the movable raw optical fiber 814 is sandwiched between the surface of the substrate 811 and the pressure application body 817, thus assuring that the fiber returns into the V-shaped groove 812. As a result, the reliability of the optical switch is secured.

Figure 28:
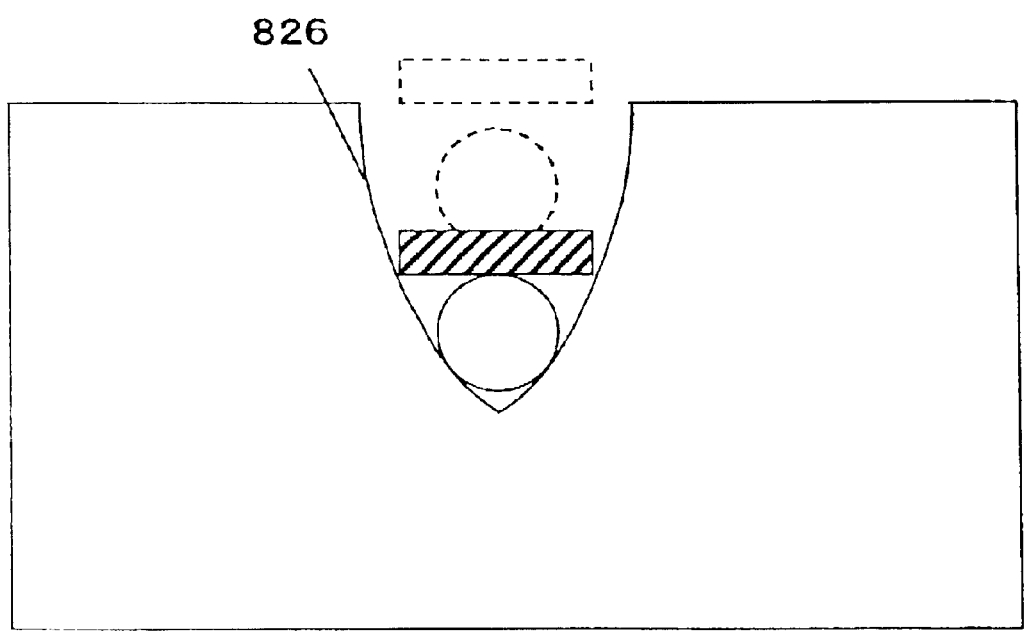
FIG. 28 is a cross-sectional view of an optical switch according to Embodiment 16 of the invention.
Figure 29:
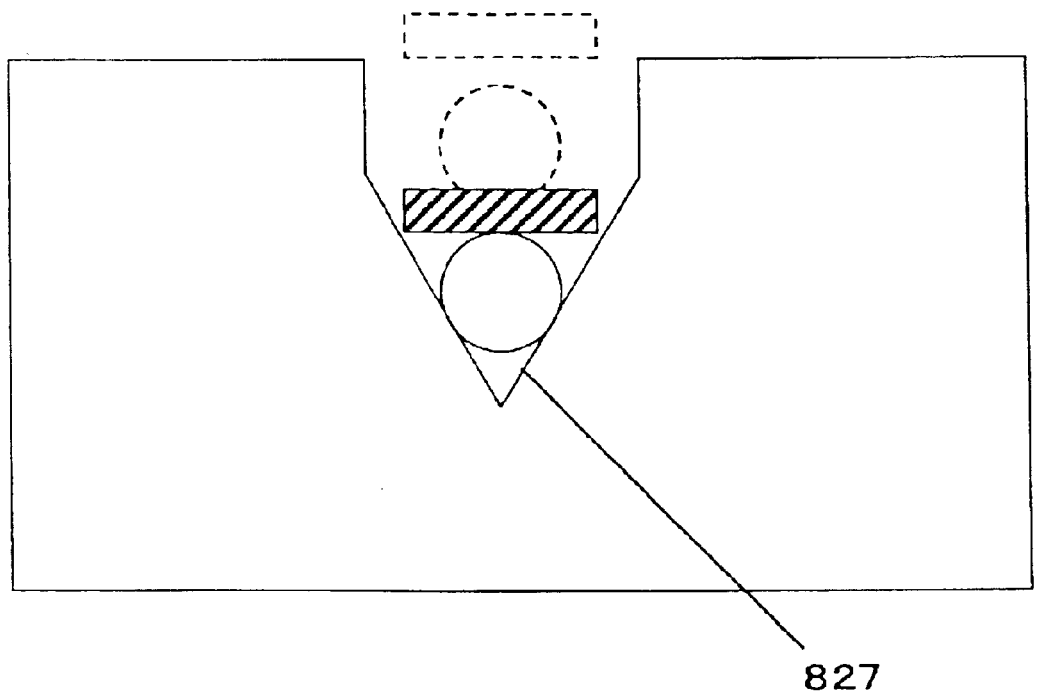
FIG. 29 is a cross-sectional view of an optical switch according to Embodiment 16 of the invention.

Stated differently, the distance from the contact point between the movable raw optical fiber 814 and the V-shaped groove 812 to the substrate surface is set greater than the amount of movement of the movable raw optical fiber 814 that receives load from the pressure application body 817. In this case, the end surface of the movable raw optical fiber 814 that has moved upward will not be completely above the substrate surface. Rather, at least a part is located below the substrate surface. The movable raw optical fiber 814 always returns into the V-shaped groove 812 without being sandwiched between the surface of the substrate 811 and the pressure application body 817.

Where the V-shaped groove is made deep in this way, the width of the V-shaped groove at the substrate surface widens. This is disadvantageous to higher density implementation as encountered when plural optical switches are arranged in parallel on the same substrate. In the description provided thus far, it has been assumed that each of the both surfaces of a V-shaped groove is formed by one plane. It may also be made of plural flat planes or curved planes. FIGS. 28 and 29 show cross sections of such an embodiment, taken on lines A–A' of FIG. 25. In FIGS. 28 and 29, the solid lines indicate the state in which no magnetic field is set up. The broken lines indicate the state in which a magnetic field is developed and the movable raw optical fiber and the pressure application member have been moved upward.

Figure 30:
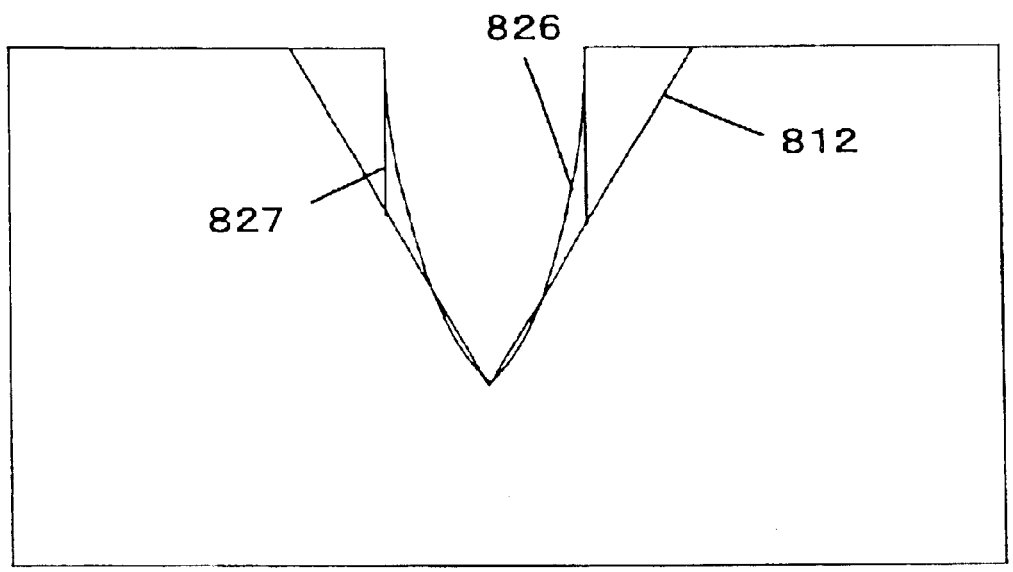
FIG. 30 is a cross-sectional view of the substrate of an optical switch according to Embodiment 16 of the invention.

In FIG. 28, the side surface of a V-shaped groove 826 is a smooth curved surface and approaches the vertical toward the surface of the substrate. In FIG. 29, the side surface of a V-shaped groove 827 is made up of four surfaces. The two surfaces located above the V-shaped groove 827 are substantially vertical to the substrate surface. Their width is set greater than the diameter of the optical fiber. To achieve higher densities, the width of the V-shaped groove 827 is preferably made as small as possible. Therefore, the width of the two lower oblique surfaces is set slightly greater than the diameter of the fiber. FIG. 30 compares the widths of the first grooves shown in FIGS. 26, 28, and 29, respectively. For the same amount of movement of the movable raw optical fiber, the width of the groove at the substrate surface can be narrowed. Hence, plural optical switches can be arranged in parallel on the same substrate. In this way, higher densities can be easily accomplished. It is possible to cope with integration of optical switches.

Figure 31:
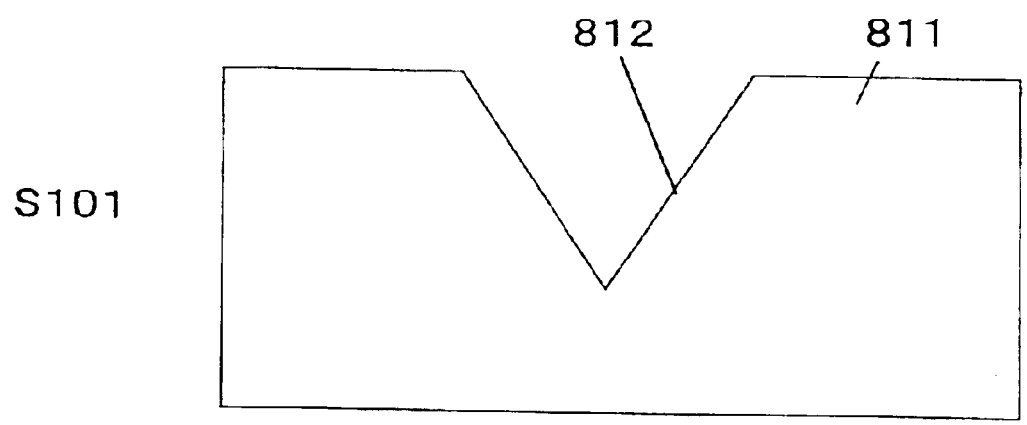
FIG. 31 is a view illustrating one example of fabrication sequence for the optical switch according to Embodiment 16 of the invention.
Figure 31:
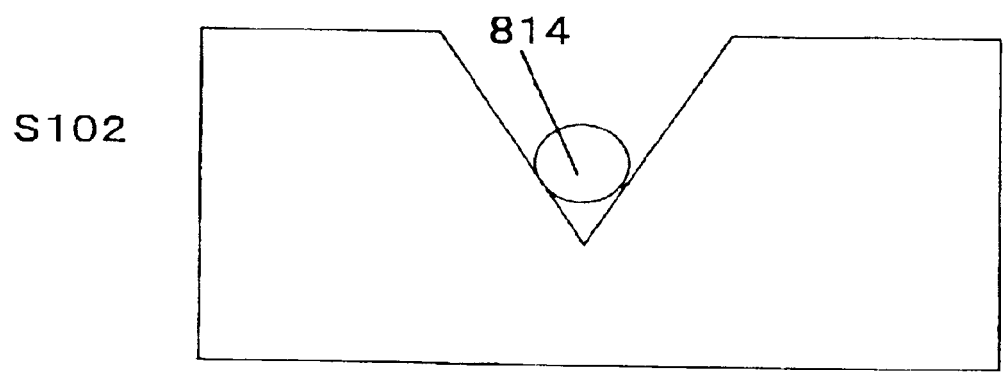
Figure 31:
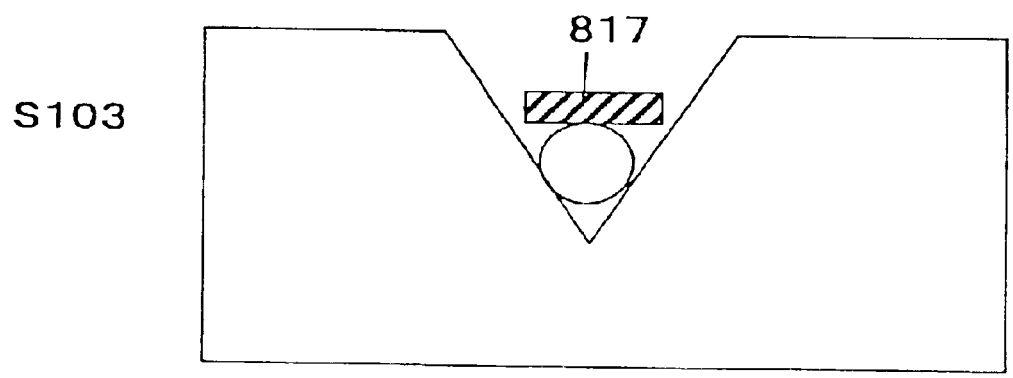

FIG. 31 illustrates one example of fabrication sequence for the optical switch according to Embodiment 16 already described in connection with FIGS. 25–27.

First, in step S101, a single silicon crystal having crystallographic orientations is used as the substrate 811. This single crystal silicon is etched into the V-shaped groove 812. The depth of the V-shaped groove 812 is set greater than the amount of movement made by the front end of the movable raw optical fiber. The etching process used here is a wet etching process making use of anisotropy of the crystal shown when immersed in a liquid etchant. Side surfaces having a given angle can be formed.

Examples are (111) and (110) planes when (100) wafer is used. A side surface can be formed from the (111) plane at an angle of 54.7° to the (100) plane of the substrate surface. Another side surface can be formed from the (110) plane at an angle of 45° to the (100) plane of the substrate surface. An alkali aqueous solution (e.g., aqueous solution of potassium hydroxide or tetramethylammonium hydroxide) having anisotropic etch rate for silicon crystallographic orientations is used. These planes can be easily formed by forming mask patterns matched to their respective crystallographic orientations by a photolithography technique and promoting the etching. Of course, the planes can be processed by dry etching utilizing activated gas such as radicals or ions. A material (e.g., silicon oxide, silicon nitride, or metal) having a high etch selectivity ratio for silicon is selected as the mask material.

Silicon oxide can be advantageously used as another substrate material. A surface of a substrate of silicon oxide is mechanically machined to form the V-shaped groove 812. For example, a cutting blade is rotated at a high speed to cut the substrate surface. In this way, a groove having a shape obtained by transferring the cross-sectional shape of the blade can be formed. A given tilt angle is given to the side surface of the groove by forming a taper on the outer surface of the blade. A side surface of any desired tilt can be easily formed by controlling the taper angle of the blade. The curved surface shown in FIG. 28 and the two-stage side surface shown in FIG. 29 can be formed by shaping the profile of the blade into such a form. Where a V-shaped groove is formed by mechanical processing, it is possible to select silicon oxide that is the same material as the raw optical fiber as the material of the substrate. Since the raw optical fiber and substrate are coincident in coefficient of thermal expansion, the relative positional relation between the core of the fixed raw optical fiber and the core of the movable raw optical fiber can be kept constant over a wide temperature range. An excellent optical switch can be manufactured in which none of insertion loss, reflection loss, and polarization dependence characteristics are dependent on temperature variations.

Then, in step S102, the fixed raw optical fiber 813 and movable raw optical fiber 814 on which the magnetic member 818 is formed are inserted into the V-shaped groove 812 and bonded at a given position with adhesive. To reduce optical loss variations due to temperature variations, it is advantageous to use silicon (that is the material of the substrate) or silicon oxide and an adhesive (e.g., epoxy-based adhesive or ceramic-based adhesive) not widely different in coefficient of thermal expansion from silicon oxide that is the material of the optical fiber.

Finally, in step S103, the pressure application body 817 is placed above the movable raw optical fiber 814 and bonded to the bonded portion 819 of the pressure application body with adhesive. At this time, a load from the pressure application body 817 is applied to the movable raw optical fiber 814. It is confirmed that the end of the movable raw optical fiber 814 is in contact with both side surfaces of the V-shaped groove 812.

In steps S102 and S103, a bonding method using an adhesive is described. Of course, other bonding methods can also be employed. Examples include: anodic bonding in which metal ions within glass act as bonding carries; hydrogen bonding in which hydrogen ions inserted in the gap form bonds; and metal bonding in which gold is applied to each bonded surface and the gold layers are compressed together.

Figure 32:
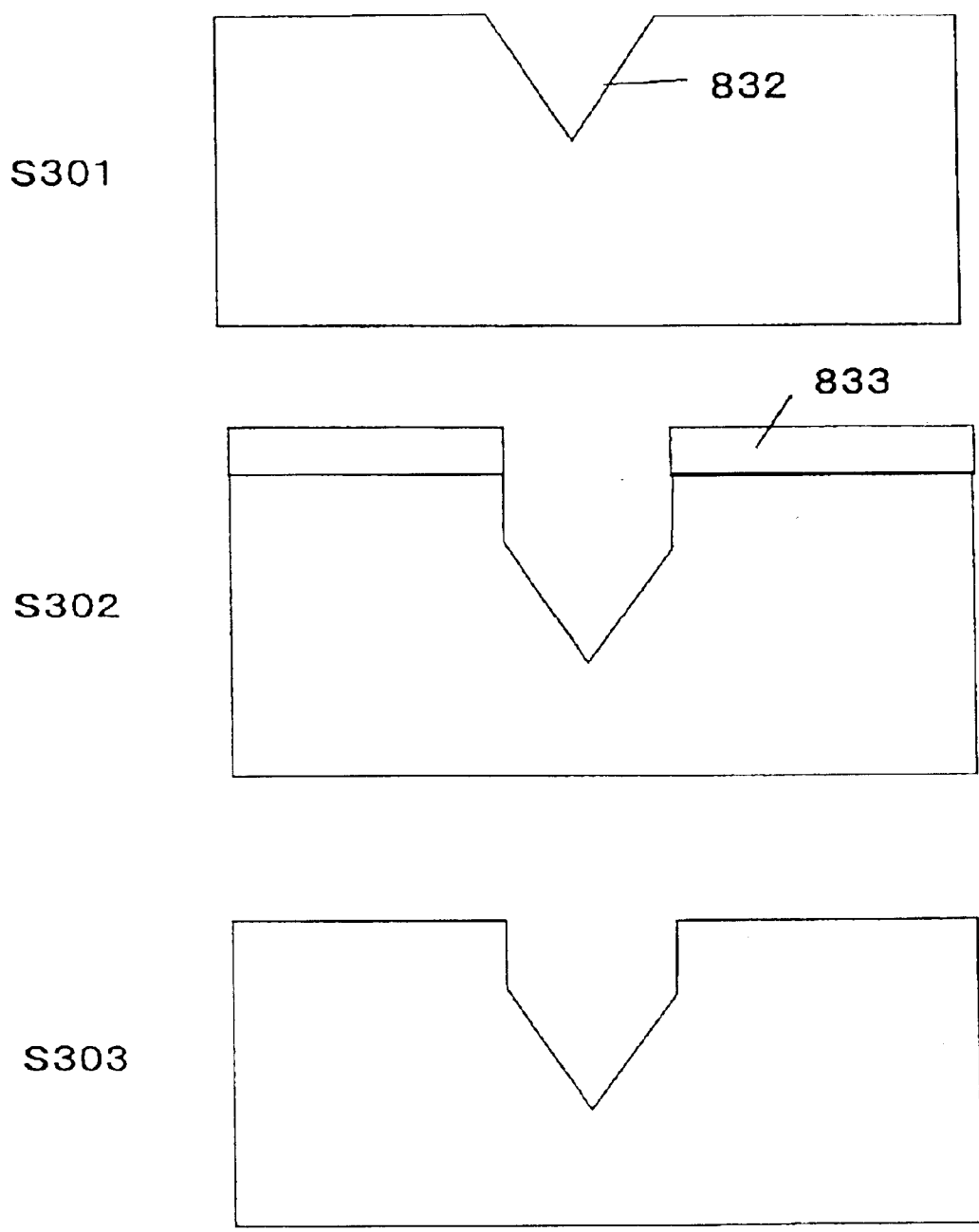
FIG. 32 is a view illustrating another example of fabrication sequence for the optical switch according to Embodiment 16 of the invention.

FIG. 32 illustrates one example of a fabrication sequence for an optical switch according to Embodiment 16 of the invention already described in connection with FIG. 29. Steps S102 and S103 are similar to the steps illustrated in FIG. 31. However, step S101 is modified to steps S301 to S303.

First, step S301 is similar to step S101. A substrate of a single crystal silicon is anisotropically etched to form a V-shaped groove 832 having a side surface of a given angle. The V-shaped groove is shallower than the V-shaped groove shown in FIG. 31. The width of the V-shaped groove at the surface of the substrate is set equal to or greater than the diameter of the movable raw optical fiber.

Then, instep S302, the first V-shaped groove is processed by a dry etching process having excellent vertical processability. The surface other than the first groove is coated with a mask 833 to process only the V-shaped groove 832. For example, vertical processing is enabled by high-density plasma etching having excellent selectivity and vertical processability without roughing the side surface of the V-shaped groove. A metal, silicon oxide, and silicon nitride are used as the mask material. The mask is accurately processed by photolithography and etching. The depth of the processed groove is greater than the amount of movement made by the front end of the movable raw optical fiber.

In the next step S303, the mask 833 is etched off.

Figure 33:
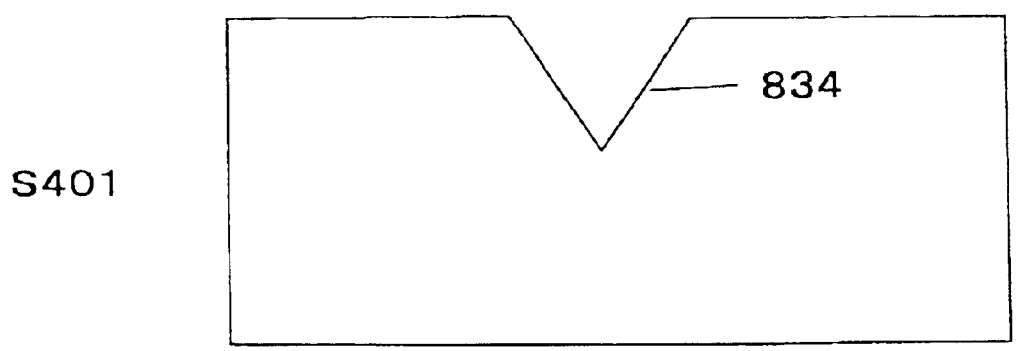
FIG. 33 is a view illustrating a further example of fabrication sequence for the optical switch according to Embodiment 16 of the invention.
Figure 33:
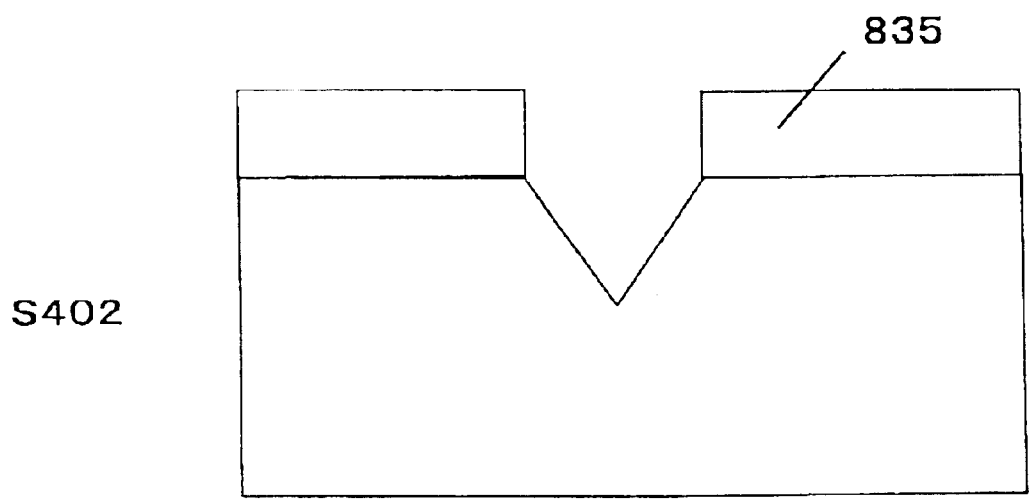

FIG. 33 illustrates another example of fabrication sequence for the optical switch according to Embodiment 16 already described in connection with FIG. 29. Steps S102 and S103 are similar to the corresponding steps of FIG. 31. However, step S101 is modified to steps S401 and S402.

First, step S401 is similar to step S101. A substrate of a single crystal silicon is anisotropically etched to form a V-shaped groove 834 having a side surface with a given angle. In the same way as in FIG. 32, the V-shaped groove is made shallower than the V-shaped groove shown in FIG. 31. The width of the V-shaped groove at the substrate surface is set equal to or greater than the diameter of the movable raw optical fiber.

Then, in step S402, a plate 835 having vertical side surfaces is stuck to the substrate surface. The plate 835 is made of silicon or silicon oxide. The plate is bonded using an adhesive or by anodic bonding or hydrogen bonding. The depth of the formed groove is set equal to or greater than the amount of movement made by the movable raw optical fiber.

Embodiment 17

Figure 34:
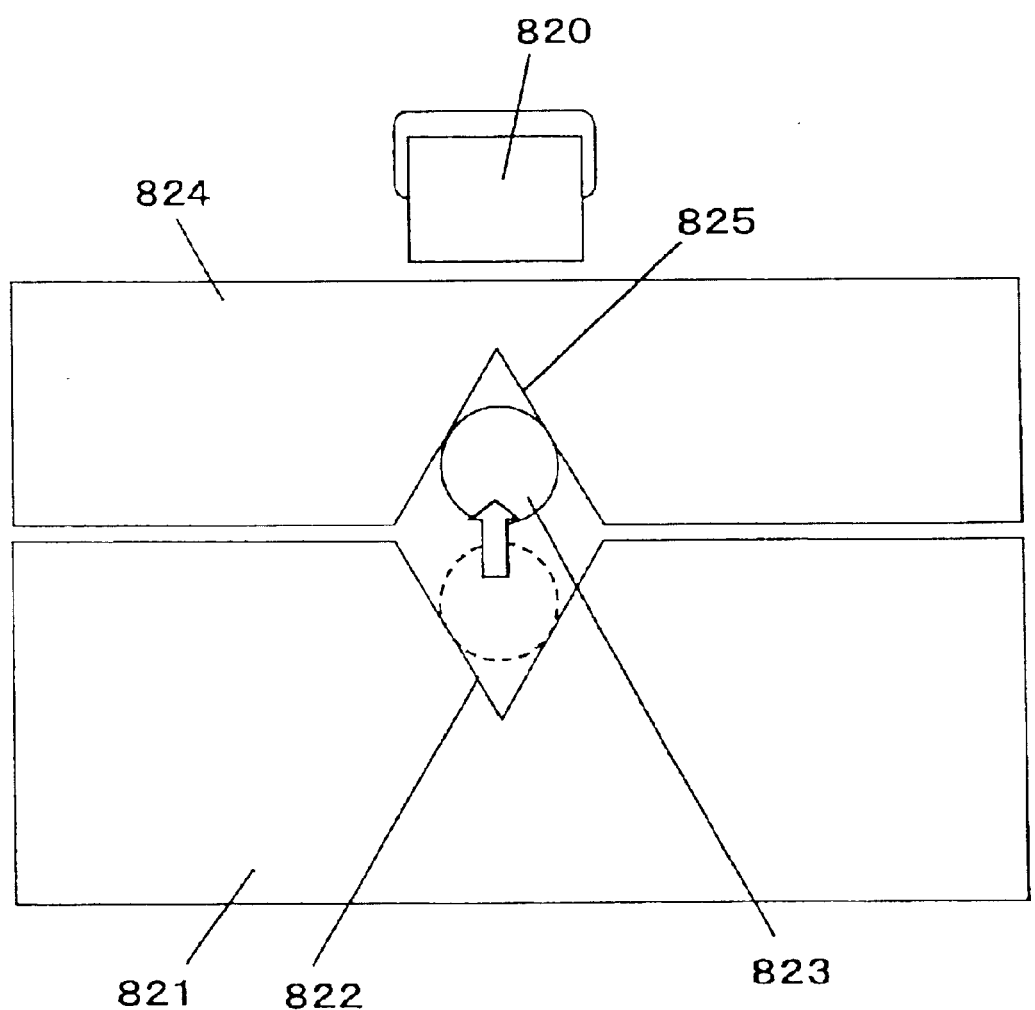
FIG. 34 is a cross-sectional view of an optical switch according to Embodiment 17 of the invention.

An optical switch according to Embodiment 17 of the present invention is described by referring to FIG. 34. The optical switch according to Embodiment 17 is similar in fundamental structure with the switch according to Embodiment 16 except that a top plate 824 is mounted above the substrate 821. A cross section (taken on line B–B' of FIG. 25) across the front-end portion of the movable raw optical fiber 823 is shown in FIG. 34. A V-shaped groove 825 is formed in the surface of the top plate 824 in an opposite relation to the V-shaped groove 822. The width of the V-shaped groove 822 at the surface of the substrate 821 is almost equal to the width of the V-shaped groove 825 at the surface of the top plate 824. Furthermore, in the lateral direction of groove, the V-shaped grooves 822 and 825 are substantially identical in position. The V-shaped groove 825 formed in the top plate 824 is only required to be present around the front end of the movable raw optical fiber 823. It is to be noted that the shape of the V-shaped groove 825 is not limited to the form shown in FIG. 34. It may also be a V-shaped groove defined by plural oblique surfaces as described in connection with the optical switch according to Embodiment 16 (FIG. 29) or a V-shaped groove having partially curved surface (FIG. 28). In FIG. 34, the state in which the movable raw optical fiber 823 is not moved is indicated by the broken line. The state in which the fiber has been shifted upward by magnetic attraction is indicated by the solid line. The movable raw optical fiber 823 moved upward is once received within the V-shaped groove 825. Since horizontal motion of the substrate 821 is restricted, if the end of the pressure application body is not parallel to the surface of the substrate 821, or if a force is applied to the movable raw optical fiber 823 from obliquely above, a load parallel to the substrate 821 would be applied to it. Even in this case, motion parallel to the surface of the substrate 821 is restricted, because the V-shaped groove 825 in the top plate 824 is located above the V-shaped groove 822 in the substrate 821. When the magnetic attraction ceases, it is assured that the fiber returns into the V-shaped groove 822 and is optically coupled to the fixed raw optical fiber.

The V-shaped groove formed in the top plate is formed by a method similar to the method used to form the V-shaped groove in the substrate. Where a material having crystallographic orientations is selected as the material of the top plate, a process step similar to S101 of FIG. 31 can be adopted. The side surface may be a curved surface as shown in FIG. 28. Furthermore, the side surface may be defined by plural surfaces including surfaces vertical to the substrate as shown in FIG. 29. Of course, plural side surfaces may be formed by machining processing or a bonding step. The V-shaped groove formed by such process steps achieves high-density optical switches arranged in parallel on the same substrate.

In the step of bonding the top plate to the substrate, a bonding method (e.g., anodic bonding, hydrogen bonding, or metal bonding) in which ions or metal form bonds is used. Because of interatomic bonding, stable and highly reliable bonding is enabled. Furthermore, the bonding operation may be performed using an adhesive. In this case, it is advantageous to use an epoxy-based or ceramic-based adhesive that does not widely differ in coefficient of thermal expansion from silicon or silicon oxide that is the material of the substrate and top plate.

Embodiment 18

Figure 35:
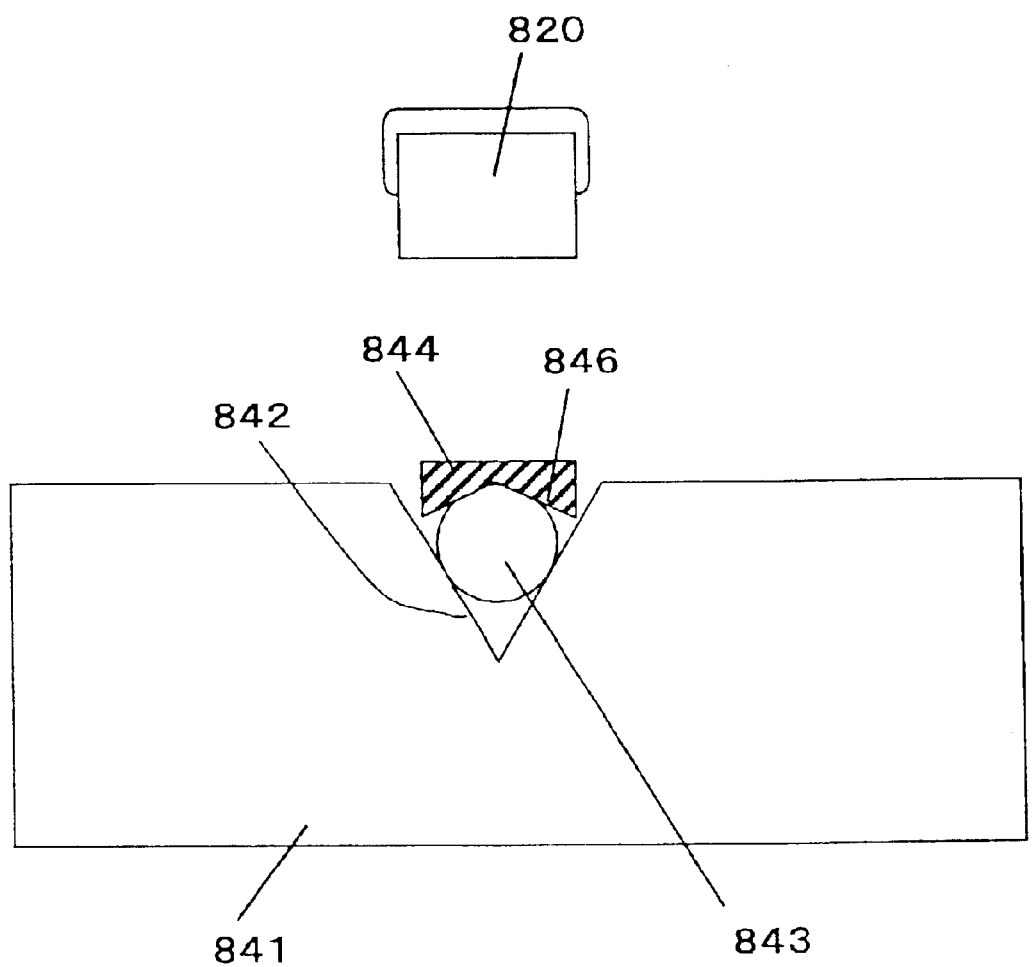
FIG. 35 is a cross-sectional view of an optical switch according to Embodiment 18 of the invention.
Figure 36:
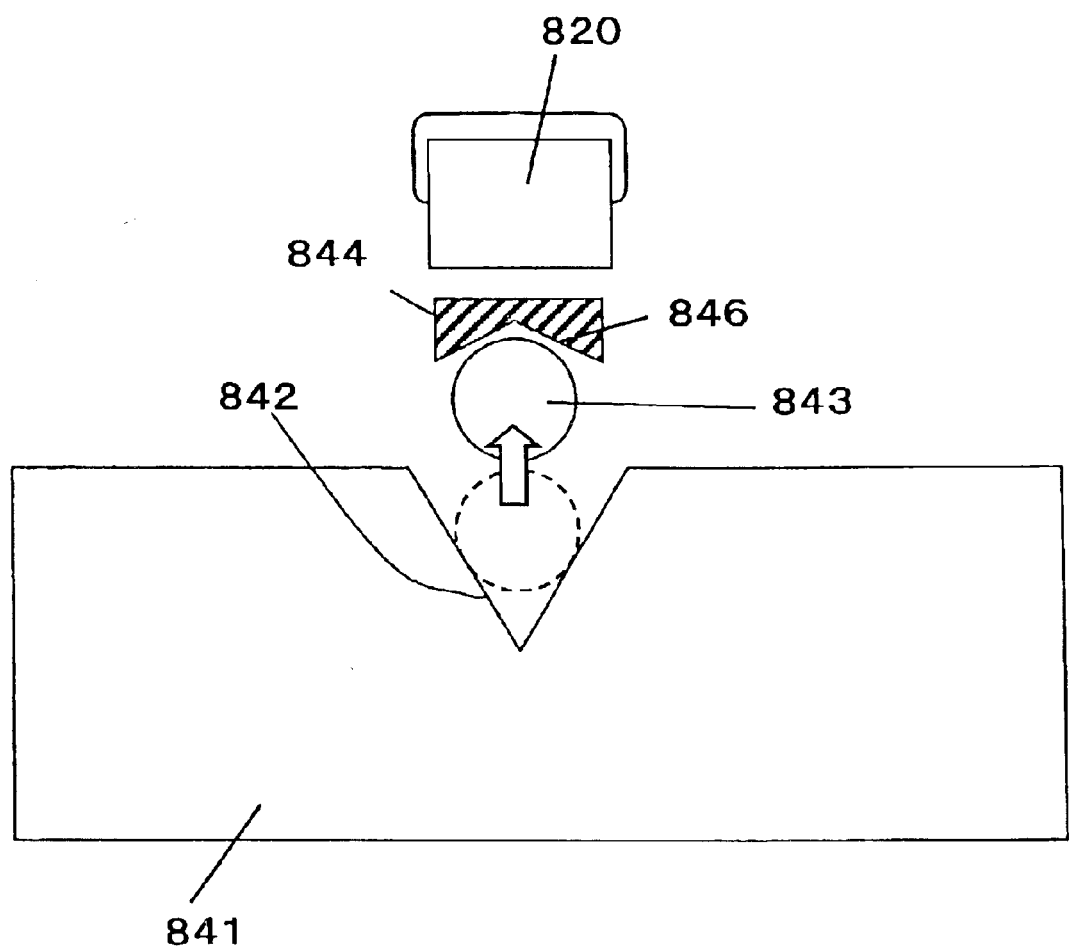
FIG. 36 is a cross-sectional view of the optical switch according to Embodiment 18 of the invention.

An optical switch according to Embodiment 18 of the present invention is described by referring to FIGS. 35 and 36. The optical switch according to Embodiment 18 is similar in fundamental structure with the optical switch according to Embodiment 16 except that a groove is formed in a part of the pressure application body. This groove limits displacement of the movable raw optical fiber in a direction parallel to the substrate surface.

FIG. 35 is a cross section taken on line A–A' of FIG. 25. A V-shaped groove 846 is formed in the pressure application body 844. The width of the V-shaped groove 846 formed in the pressure application body 844 is set equal to or greater than the diameter of the movable raw optical fiber 843. The shape of the V-shaped groove 846 is not limited to the form shown in FIG. 35. Of course, the groove may be the V-shaped groove defined by plural oblique side surfaces of the optical switch described in Embodiment 16 (FIG. 29). The groove may also be the V-shaped groove having a partially curved side surface (FIG. 28). The load on the movable raw optical fiber 843 is applied from the inner surface of the V-shaped groove 846. The movable optical fiber 843 is optically coupled to the fixed optical fiber while in contact with both side surfaces of the V-shaped groove 842 formed in the substrate 841 and with the inner surface of the V-shaped groove 846 formed in the pressure application body 844. FIG. 36 shows the state in which the front end of the pressure application body 844 and the front end of the movable raw optical fiber 843 have been moved upward by energizing the electromagnet to produce a magnetic field. At this time, the center of the cross section of the movable raw optical fiber 843 has moved above the surface of the substrate 841. When the magnetic field is made to cease again, the movable raw optical fiber 843 moves downward. At this time, the V-shaped groove 846 limits motion of the movable raw optical fiber 843 in a direction parallel to the substrate 841. Therefore, if the depth of the V-shaped groove 842 is shallower than the example described in Embodiment 16, the movable raw optical fiber 843 returns into the V-shaped groove 842. Then, this groove 842 is returned into the position shown in FIG. 36 by the load from the inner surface of the V-shaped groove 846 and optically coupled to the fixed raw optical fiber. The optical switch according to Embodiment 18 makes it possible to offer a high-performance optical switch at low cost, the switch being further characterized in that the number of components is suppressed and the required assembly accuracy is not so high.

As described thus far, the movable raw optical fiber can be easily aligned along the groove by other method provided that the structure is so designed that the portion placed close to the front end of the movable raw optical fiber and overlying the groove is pushed into the groove by a resilient member such as a leaf spring in the longitudinal direction of the groove from the opposite side of the groove. In addition, the state in which the movable raw optical fiber transiently vibrates within the groove can be reduced. Furthermore, whether the groove is singular or plural, fiber can be pushed into each groove using the same structure. Consequently, the same advantages as produced by the above-described embodiments can be obtained.

Where plural grooves are present, if they are easily aligned when the movable raw optical fiber is displaced, it is not required that they be substantially parallel to each other. They may also be arranged substantially radially about the pivot of the cantilevered movable raw optical fiber. The above description centers on the case where a magnetic force is used to drive the movable raw optical fiber. Of course, it is possible that the leaf spring is made of a bimetal or shape memory alloy and the movable raw optical fiber is deformed by resistive heating to thereby drive the fiber.

In the embodiments described thus far, the leaf spring is driven by an electromagnet. In this structure, it is obvious that a self-holding function can be easily added using a permanent magnet in addition to the electromagnet.

As described thus far, optical switches according to the present invention have main components which can be fabricated by fabrication processes similar to semiconductor processes and so the optical switches according to the invention can be mass-produced accurately. Furthermore, they are relatively simple in structure. They are less affected by assembly accuracy because optical fibers are pushed using leaf springs. Consequently, it is easy to make adjustments during assembly. For these reasons, high-performance, low-cost optical switches that can be mass-produced can be offered.

Furthermore, the optical switch according to the present invention is so designed that a movable raw optical fiber is pushed by a leaf spring or the like. In consequence, a transient state in which the front end of the optical fiber vibrates when the state of operation is switched by an electrical current can be suppressed. Moreover, if vibrations are applied to the optical switch in a deenergized state, the optical path is not interrupted and so stable characteristics can be obtained.

In addition, glass or silicon that is close in coefficient of thermal expansion to optical fiber is used in the substrate. Therefore, stable operation is assured against temperature variations. Further, the switch can be easily sealed because the support substrate is processed at high accuracy. This enhances the reliability against environmental conditions including moisture variations and the existence of dust.

What is claimed is:

1. An optical switch comprising:
   a support substrate having at least one groove in a surface thereof;
   a single movable raw optical fiber that can cantilever and brought into and out of alignment along said groove;
   at least one fixed raw optical fiber having an end surface that is spaced a given distance from an end surface of said movable raw optical fiber, vicinities of a front end of said fixed raw optical fiber being aligned along said groove;
   a push body for pushing vicinities of a front end of said movable raw optical fiber toward said groove;
   a lift structure for moving the front end of said movable raw optical fiber away from said groove; and
   a control device for controlling operation of at least one of said push body and said lift structure.

2. The optical switch of claim 1, wherein said at least one groove consists of two substantially parallel grooves having openings opposite to each other, and wherein said movable raw optical fiber is aligned along one of said grooves when said movable raw optical fiber moves.

3. The optical switch of claim 1, wherein said end surfaces of said movable and fixed raw optical fibers are formed at an angle to a plane perpendicular to the direction of center axis of each of said optical fibers.

4. The optical switch of claim 1, wherein at least a part of said push body has a resilient structure that is displaced substantially perpendicularly to said groove.

5. The optical switch of claim 1, wherein said lift structure makes use of resilient force of said movable raw optical fiber.

6. The optical switch of claim 1, wherein said lift structure makes use of magnetic force exerted between the lift structure and said control device.

7. The optical switch of claim 1, wherein said push body and said lift structure are formed integrally.

8. The optical switch of claim 1, wherein said control device is an electromagnet.

9. An optical switch comprising:
   a support substrate having a groove in a surface thereof;
   a single movable raw optical fiber that has a base portion held in a part of said groove, said movable raw optical fiber being capable of cantilevering;
   a drive body disposed close to a front end of said movable raw optical fiber, at least a part of said drive body being made of a magnetic material;
   a fixed raw optical fiber held in a part of said groove in such a way that an end surface of said fixed raw optical fiber is opposite to an end surface of said movable raw optical fiber at a given space;
   a push body for pushing vicinities of a front end of said movable raw optical fiber toward said support substrate, at least a part of said push body being made of a magnetic material; and
   an electromagnet for applying a magnetic force to said drive body and to said push body, said magnetic force being directed substantially perpendicularly to said support substrate.

10. An optical switch comprising:
    a support substrate having a groove in a surface thereof;
    a single movable raw optical fiber that has a base portion held in a part of said groove, said movable raw optical fiber being capable of cantilevering;
    a lift structure for applying a force in a direction to move a front end of said movable raw optical fiber away from said groove;
    a fixed raw optical fiber held in a part of said groove in such a way that an end surface of said fixed raw optical fiber is opposite to an end surface of said movable raw optical fiber at a given space;
    a push body for pushing vicinities of a front end of said movable raw optical fiber toward said support substrate, at least a part of said push body being made of a magnetic material; and
    an electromagnet for applying a magnetic force to said push body, said magnetic force being directed substantially perpendicularly to said support substrate.

11. The optical switch of claim 10, wherein said push body has said lift structure.

12. An optical switch comprising:
    a support substrate having a first groove in a surface thereof;
    an upper substrate disposed substantially parallel to said support substrate;
    a second groove formed in a position where a plane passing through said first groove and extending perpendicularly to said support substrate intersects said upper substrate;
    a single movable raw optical fiber having a part held in said second groove, said movable raw optical fiber being capable of cantilevering;
    a push body for pushing vicinities of a front end of said movable raw optical fiber into said first groove, a part of said push body being held on said upper substrate;
    a fixed raw optical fiber having an end surface spaced a given distance from an end surface of said movable raw optical fiber, the end surface of said fixed raw optical fiber being disposed substantially parallel and opposite to the end surface of said movable raw optical fiber, a part of said fixed raw optical fiber being held in said first groove; and
    an electromagnet for applying a magnetic force to said push body, said magnetic force being directed substantially perpendicularly to said support substrate.

13. An optical switch comprising:
    a support substrate having a first groove in a surface thereof;
    an upper substrate disposed substantially parallel to said support substrate;
    a second groove formed in a position where a plane passing through said first groove and extending perpendicularly to said support substrate intersects said upper substrate;
    a single movable raw optical fiber having a part held in said second groove, said movable raw optical fiber being capable of cantilevering;
    a push body for pushing vicinities of a front end of said movable raw optical into said first groove, a part of said push body being held on said upper substrate;
    a first fixed raw optical fiber having an end surface that is spaced a given distance from an end surface of said movable raw optical fiber in a first position of said movable raw optical fiber, the end surface of said fixed raw optical fiber being disposed substantially parallel and opposite to the end surface of said movable raw optical fiber, a part of said fixed raw optical fiber being held in said first groove;
    a second fixed raw optical fiber having an end surface that is spaced a given distance from the end surface of said movable raw optical fiber in a second position of said movable raw optical fiber, the end surface of said fixed raw optical fiber being disposed substantially parallel and opposite to the end surface of said movable raw optical fiber, a part of said second fixed raw optical fiber being held in said second groove; and an electromagnet for applying a magnetic force to said push body, said magnetic force being directed substantially perpendicularly to said support substrate.

14. An optical switch comprising:

a support substrate having a first groove in a surface thereof;

an upper substrate disposed substantially parallel to said support substrate;

a single movable raw optical fiber having a part held in said first groove, said movable raw optical fiber being capable of cantilevering;

a push body for pushing vicinities of a front end of said movable raw optical fiber into said first groove, a part of said push body being held on said upper substrate;

a fixed raw optical fiber having an end surface that is spaced a given distance from an end surface of said movable raw optical fiber, the end surface of said fixed raw optical fiber being disposed substantially parallel and opposite to the end surface of said movable raw optical fiber, a part of said fixed raw optical fiber being held in said first groove;

a resilient force-generating mechanism for displacing the vicinities of the front end of said movable raw optical fiber toward said upper substrate by a resilient force of said movable raw optical fiber itself; and an electromagnet for applying a magnetic force to said push body on the same side as said upper substrate, said magnetic force being directed substantially perpendicularly to said support substrate.

15. An optical switch comprising:

a support substrate having a groove in a surface thereof;

a single movable raw optical fiber that has a base portion held in a part of said groove, said movable raw optical fiber being capable of cantilevering;

a fixed raw optical fiber held in a part of said groove in such a way that an end surface of said fixed raw optical fiber is opposite to an end surface of said movable raw optical fiber at a given space;

a push body for pushing vicinities of a front end of said movable raw optical fiber toward said support substrate; and a drive mechanism for applying a force in a direction to move the front end of said movable raw optical fiber away from said groove, said drive mechanism being located closer to said base portion than a position where said push body acts on said movable raw optical fiber.

16. An optical switch comprising:

a support substrate having a first groove in a surface thereof;

an upper substrate having a second groove opposite to said first groove;

a single movable raw optical fiber having a base portion held in a part of said first groove, said movable raw optical fiber being capable of cantilevering;

a fixed raw optical fiber held in a part of said second groove in such a way that an end surface of said fixed raw optical fiber is opposite to an end surface of said movable raw optical fiber at a given space;

a push body for pushing vicinities of a front end of said movable raw optical fiber toward said support substrate; and a drive mechanism for applying a force in a direction to move the front end of said movable raw optical fiber away from said first groove, said drive mechanism being located closer to said base portion than a position where said push body acts on said movable raw optical fiber.

17. An optical switch comprising:

a support substrate having a first groove in a surface thereof;

an upper substrate having a second groove opposite to said first groove;

a single movable raw optical fiber having a base portion held in a part of said first groove, said movable raw optical fiber being capable of cantilevering;

a first fixed raw optical fiber held in a part of said first groove in such a way that an end surface of said first fixed raw optical fiber is opposite to an end surface of said movable raw optical fiber at a given space in a first position of said movable raw optical fiber;

a second fixed raw optical fiber held in a part of said second groove in such a way that an end surface of said second fixed raw optical fiber is opposite to the end surface of said movable raw optical fiber at a given space in a second position of said movable raw optical fiber;

a push body for pushing vicinities of a front end of said movable raw optical fiber toward said support substrate; and a drive mechanism for applying a force in a direction to move the front end of said movable raw optical fiber away from said first groove, said drive mechanism being located closer to said base portion than a position where said push body acts on said movable raw optical fiber.

18. An optical switch comprising:

a first substrate having a first groove in a surface thereof;

a second substrate disposed over said first substrate and provided with a second groove in a position opposite to said first groove;

a first fixed raw optical fiber held in said first groove;

a second fixed raw optical fiber disposed substantially parallel to said first fixed raw optical fiber and held in said second groove in such a way that an end surface of said second fixed raw optical fiber is substantially coincident with an end surface of said first fixed raw optical fiber in position taken along an optical axis;

a movable raw optical fiber having an end surface close to said first fixed raw optical fiber, said movable raw optical fiber having a base portion held in said first groove, said movable raw optical fiber having a front end capable of cantilevering;

a first pressure application body for applying a load to vicinities of the front end of said movable raw optical fiber toward said first substrate, at least a part of said first pressure application body being made of a magnetic material;

a second pressure application body for applying a load to vicinities of the front end of said movable raw optical fiber toward said second substrate, at least a part of said second pressure application body being made of a magnetic material; and an electromagnet for applying a magnetic force to said first and second pressure application bodies substantially perpendicularly to said substrates.

19. An optical switch comprising:

a substrate having a first groove in a surface thereof;

a fixed raw optical fiber held in said first groove;

a movable raw optical fiber having an end surface that is spaced a given distance from an end surface of said fixed raw optical fiber and faces each other, said movable raw optical fiber being capable of cantilevering;

a pressure application body for applying a load to vicinities of a front end of said movable raw optical fiber, said load being directed toward said substrate, at least a part of said pressure application body being made of a magnetic material;

a drive body formed close to the front end of said movable raw optical fiber, at least a part of said pressure application body being made of a magnetic material; and an electromagnet for applying a magnetic force to said pressure application body and to said drive body substantially perpendicularly to said substrate;

wherein center of the end surface of said movable raw optical fiber that has moved has shifted from the surface of said substrate in the direction of depth of said first groove.

20. An optical switch comprising:

a substrate having a first groove in a surface thereof;

a fixed raw optical fiber held in said first groove;

a movable raw optical fiber having an end surface that is spaced a given distance from an end surface of said fixed raw optical fiber and faces each other, said movable raw optical fiber being capable of cantilevering;

a pressure application body for applying a load to vicinities of a front end of said movable raw optical fiber, said load being directed toward said substrate, at least a part of said pressure application body being made of a magnetic material;

a drive body formed close to the front end of said movable raw optical fiber, at least a part of said pressure application body being made of a magnetic material; and an electromagnet for applying a magnetic force to said pressure application body and to said drive body substantially perpendicularly to said substrate;

wherein the width of said first groove decreases in the direction of depth; and wherein the distance from a contact point where said movable raw optical fiber contacts a part of the side surface of said first groove to the surface of said first groove is equal to or greater than an amount of movement made by said movable raw optical fiber.

21. An optical switch comprising:

a substrate having a first groove in a surface thereof;

a fixed raw optical fiber held in said first groove;

a movable raw optical fiber having an end surface that is spaced a given distance from an end surface of said fixed raw optical fiber and faces each other, said movable raw optical fiber being capable of cantilevering;

a pressure application body for applying a load to vicinities of a front end of said movable raw optical fiber, said load being directed toward said substrate, at least a part of said pressure application body being made of a magnetic material;

a drive body formed close to the front end of said movable raw optical fiber, at least a part of said pressure application body being made of a magnetic material;

an electromagnet for applying a magnetic force to said pressure application body and to said drive body substantially perpendicularly to said substrate; and a top plate having a second groove in a surface thereof such that a gap is formed between said first and second grooves.

22. An optical switch comprising:

a substrate having a first groove in a surface thereof;

a fixed raw optical fiber held in said first groove;

a movable raw optical fiber having an end surface that is spaced a given distance from an end surface of said fixed raw optical fiber and faces each other, said movable raw optical fiber being capable of cantilevering;

a pressure application body, at least a part of said pressure application body being made of a magnetic material, said pressure application body being provided with a third groove in a part thereof, said pressure application body acting to apply a load to vicinities of a front end of said movable raw optical fiber via said third groove, said load being directed toward said substrate;

a drive body formed close to the front end of said movable raw optical fiber, at least a part of said pressure application body being made of a magnetic material; and an electromagnet for applying a magnetic force to said pressure application body and to said drive body substantially perpendicularly to said substrate.

* * * * *